United States Patent
Zhang et al.

(10) Patent No.: US 10,575,281 B2
(45) Date of Patent: Feb. 25, 2020

(54) METHOD AND DEVICE FOR NARROWBAND ALLOCATION, AND METHOD AND DEVICE FOR ACQUIRING NARROWBAND ALLOCATION

(71) Applicant: ZTE Corporation, Shenzhen (CN)

(72) Inventors: Wen Zhang, Shenzhen (CN); Shuqiang Xia, Shenzhen (CN); Bo Dai, Shenzhen (CN); Jing Shi, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 196 days.

(21) Appl. No.: 15/638,676

(22) Filed: Jun. 30, 2017

(65) Prior Publication Data
US 2017/0367074 A1 Dec. 21, 2017

Related U.S. Application Data

(63) Continuation of application No. PCT/CN2015/095826, filed on Nov. 27, 2015.

(30) Foreign Application Priority Data

Dec. 31, 2014 (CN) .......................... 2014 1 0856124
May 15, 2015 (CN) .......................... 2015 1 0250603

(51) Int. Cl.
H04W 72/04 (2009.01)
H04L 5/00 (2006.01)
(Continued)

(52) U.S. Cl.
CPC ........... H04W 72/04 (2013.01); H04L 5/0057 (2013.01); H04L 5/0055 (2013.01); H04L 25/0226 (2013.01); H04L 27/2611 (2013.01)

(58) Field of Classification Search
CPC ..... H04L 5/003; H04L 5/0057; H04L 5/0053; H04L 5/0055; H04L 25/0226; H04L 27/2611; H04W 72/04
See application file for complete search history.

(56) References Cited

U.S. PATENT DOCUMENTS

2012/0163350 A1  6/2012  Seo
2013/0077584 A1  3/2013  Lee
(Continued)

FOREIGN PATENT DOCUMENTS

CN   102387587 A   3/2012
CN   102958133 A   3/2013
(Continued)

OTHER PUBLICATIONS

Huawei, "Supporting FDM for Rel-13 MTC UEs and other UEs", Nov. 17-21, 2014, 3GPP TSG RAN WG1 Meeting #79, R1-145102, pp. 1-4 (Year: 2014).*
(Continued)

Primary Examiner — Paul H Masur
(74) Attorney, Agent, or Firm — Cantor Colburn LLP

(57) ABSTRACT

A method and device for narrowband allocation, and a method and device for acquiring narrowband allocation are provided. In the method, at least one narrowband is allocated to a User Equipment (UE), and at least one Physical Resource Block (PRB) contained in each of the at least one narrowband is not overlapped, or at least one PRB contained in part or all of the at least one narrowband is partially overlapped.

19 Claims, 14 Drawing Sheets

(51) Int. Cl.
*H04L 25/02* (2006.01)
*H04L 27/26* (2006.01)

(56) References Cited

U.S. PATENT DOCUMENTS

| | | | | |
|---|---|---|---|---|
| 2013/0322363 | A1* | 12/2013 | Chen | H04W 72/042 370/329 |
| 2015/0009939 | A1* | 1/2015 | Zhang | H04W 72/1289 370/329 |
| 2017/0290016 | A1* | 10/2017 | Yi | H04W 72/042 |
| 2018/0020365 | A1* | 1/2018 | Xiong | H04W 74/0833 |
| 2018/0076924 | A1* | 3/2018 | Lee | H04L 1/0026 |

FOREIGN PATENT DOCUMENTS

| | | |
|---|---|---|
| CN | 103096379 A | 5/2013 |
| CN | 103327615 A | 9/2013 |
| CN | 103379552 A | 10/2013 |
| WO | 2013173673 A2 | 11/2013 |

OTHER PUBLICATIONS

LG Electronics, "Discussion on low cost UEs", Nov. 17-21, 2014, 3GPP TSG RAN WG1 Meeting #79, R1-144891, pp. 1-6 (Year: 2014).*
International Search Report for corresponding application PCT/CN2015/095826 filed on Nov. 27, 2015; dated Mar. 1, 2016.
European Search Report for corresponding application EP15875030; Report dated Nov. 27, 2017.
Huawei et al.,"Supporting FDM for Rel-13 MTC UE's and other UEs", 3GPP Draft; vol. RAN WGI, No. San Francisco, 20141117-20141121, Nov. 17, 2014; XP050876134.
LG Electronics: "Discussion on low cost UE's", 3GPP Draft; vol. RAN WGI, No. San Francisco, 20141117-20141121; Nov. 17, 2014, XP050875949.

* cited by examiner

Allocate at least one narrowband to a UE, wherein at least one PRB contained in each of the at least one narrowband is not overlapped, or at least one PRB contained in part or all of the at least one narrowband is partially overlapped — S102
Fig. 1
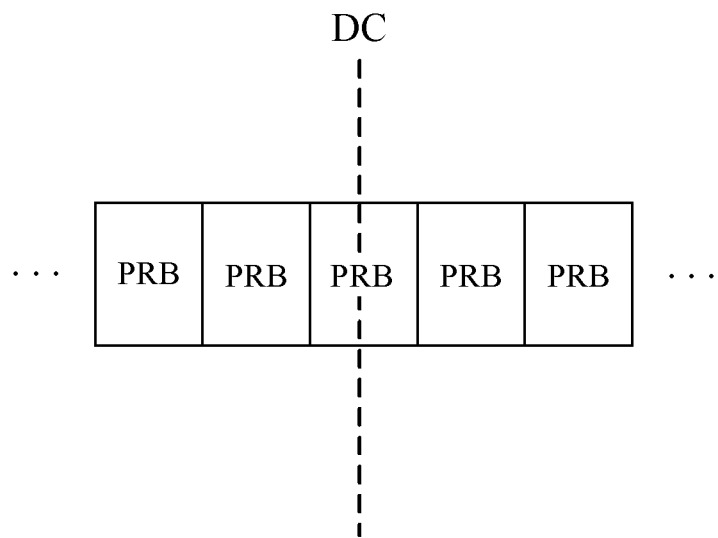
Fig. 2
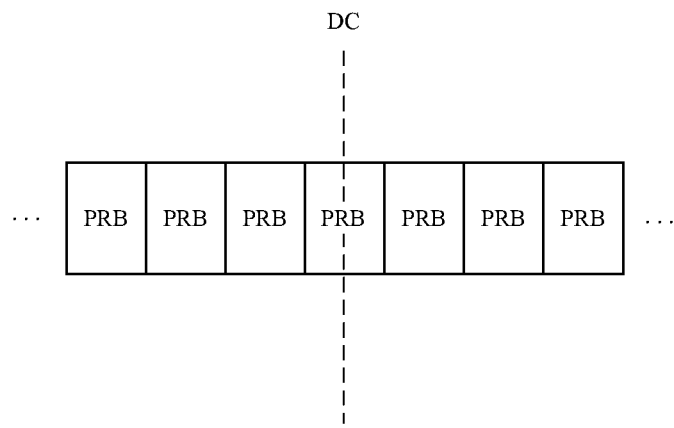
Fig. 3

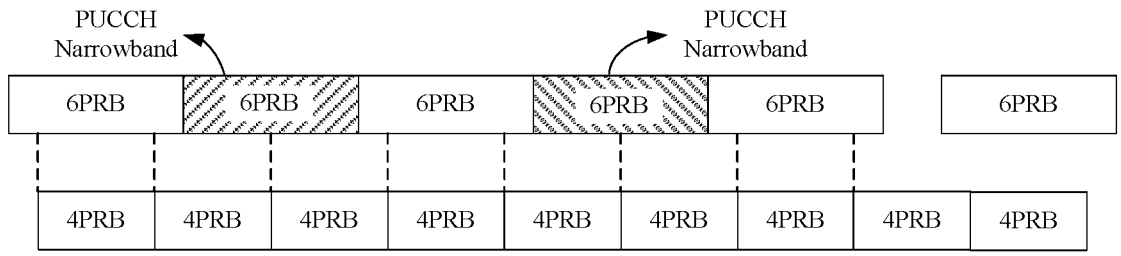
Fig. 24
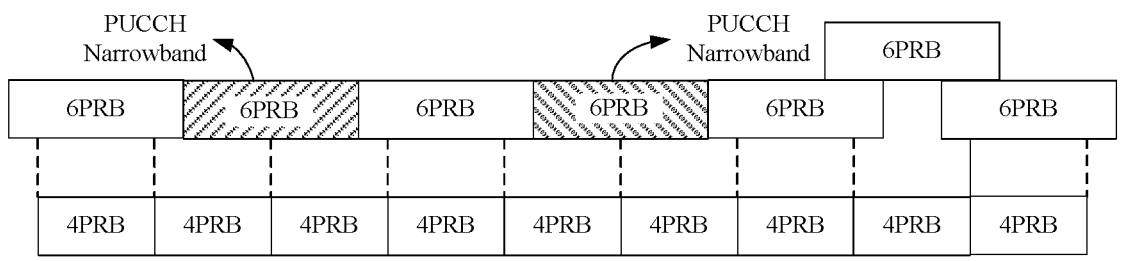
Fig. 25
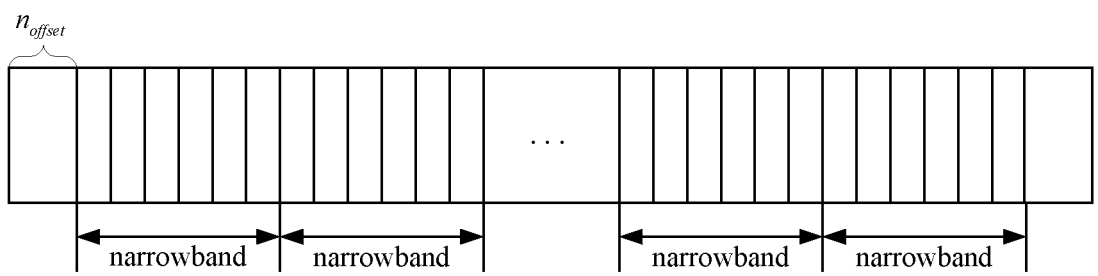
Fig. 26
Acquire at least one narrowband allocated by an eNB, wherein at least one PRB contained in each of the at least one narrowband is not overlapped, or at least one PRB contained in part or all of the at least one narrowband is partially overlapped — S2602
Fig. 27

Allocation component
10

Fig. 28

Acquisition component
20

METHOD AND DEVICE FOR NARROWBAND ALLOCATION, AND METHOD AND DEVICE FOR ACQUIRING NARROWBAND ALLOCATION

CROSS REFERENCE TO RELATED APPLICATIONS

This application is a continuation of International Patent Application Number PCT/CN2015/095826 filed on Nov. 27, 2015 which claims priority to Chinese Patent Application Number 201410856124.X filed on Dec. 31, 2014 and to Chinese Patent Application No. 201510250603.1 filed on May 15, 2015, all of which said applications are herein incorporated by reference in their entirety.

TECHNICAL FIELD

The disclosure relates to the field of communications, and in particular to a method and device for narrowband allocation, and a method and device for acquiring narrowband allocation.

BACKGROUND

A Machine Type Communication (MTC) User Equipment (UE or terminal) is also referred to as Machine to Machine (M2M) user communication equipment. And the MTC UE is a main application form of the current internet of things.

Recently, as a spectral efficiency of a Long-Term Evolution (LTE) or Long-Term Evolution Advance (LTE-Advance or LTE-A) system is high, more and more mobile operators select LTE or LTE-A as an evolution direction of a broadband wireless communication system. LTE/LTE-A-based multiple types of MTC data services will be more attractive.

The MTC UE is usually a low-cost device, characterized by small supported Radio Frequency (RF) bandwidths, single receiving antennae and the like, RF sending and receiving bandwidths being 1.4 MHz generally. Under the condition that a system bandwidth is greater than 1.4 MHz, it is necessary to allocate multiple downlink or uplink working narrowbands to the MTC UE, so that the MTC UE can receive or send a signal on these narrowbands. And narrowbands are allocated to the MTC UE, and overheads of indicating resource allocations can be further reduced.

In the LTE system, resource allocation modes 'type 0' and 'type 1' are based on downlink data allocation. And several successive Physical Resource Blocks (PRBs) constitute a Resource Block Group (RBG). A size of the RBG is associated with the system bandwidth, and the size of the RBG is one kind of 1, 2, 3 and 4. In a resource allocation mode 'type 0', a resource allocation granularity is the RBG.

In the LTE system, a cell will broadcast a cell-specific parameter namely a Sounding Reference Signal (SRS) bandwidth, which is a maximum SRS bandwidth of the cell and is hereinafter referred to as an SRS bandwidth of the cell. The UE in the cell sends an SRS in the SRS bandwidth of the cell. The SRS sending bandwidth of the UE is not greater than the SRS bandwidth of the cell, and the SRS sending bandwidth of the UE is hereinafter referred to as an SRS bandwidth of the UE. The SRS bandwidth of the cell is an integral multiple of four PRBs, and consists of a plurality of SRS bandwidths having four PRBs. The SRS bandwidth of each UE occupying at least one successive SRS bandwidths has four PRBs. In addition to the SRS bandwidth of the UE, an evolved Node B (eNB) will configure other SRS sending parameters for the UE, which include: a starting frequency domain position, combing teeth, a sending period and an offset, so the UE can periodically or non-periodically send an SRS. The eNB obtains a channel situation of the UE by measuring the SRS. During scheduling of UE transmission, the UE is scheduled to an appropriate frequency domain position for data transmission according to the obtained channel situation of the UE so as to obtain a scheduling gain. The SRS bandwidth of the UE is an integral multiple of four PRBs, and the MTC UE supports SRS bandwidths having four PRBs at most.

In some situations, a solution involved in a narrowband allocation mode has not been provided yet.

SUMMARY

At least some embodiments of the disclosure provide a method and device for narrowband allocation, and a method and device for acquiring narrowband allocation, so as at least to partially solve a problem that a solution involved in a narrowband allocation mode has not been provided yet.

In an embodiment of the disclosure, a method for narrowband allocation is provided, which includes that: allocating at least one narrowband to a User Equipment (UE). At least one Physical Resource Block (PRB) contained in each of the at least one narrowband is not overlapped, or at least one PRB contained in part or all of the at least one narrowband is partially overlapped.

In one embodiment, when one of the at least one narrowband is a downlink central narrowband and $N_{RB}$ is an odd number, a PRB index interval of the downlink central narrowband is one of the following:

$[(N_{RB}-1)/2-2, (N_{RB}-1)/2+2]$;

$[(N_{RB}-1)/2-3, (N_{RB}-1)/2+3]$;

$[(N_{RB}-1)/2-3, (N_{RB}-1)/2+2]$;

$[(N_{RB}-1)/2-2, (N_{RB}-1)/2+3]$;

or when $N_{RB}$ is an even number, a PRB index interval of the central narrowband is: $[N_{RB}/2-3, N_{RB}/2+2]$. $N_{RB}$ is a number of PRBs corresponding to a system bandwidth, and a PRB index in the PRB index interval refers to the PRB index obtained by numbering, starting from zero, PRBs in a downlink system bandwidth according to an ascending order from lowest frequency to highest frequency.

In one embodiment, when one of the at least one narrowband is a downlink narrowband but not a downlink central narrowband or one of the at least one narrowband is an uplink narrowband, a PRB index interval of one of the at least one narrowband is one of the following:

$[k \times G, k \times G+5]$;

$[k \times G-6, k \times G-1]$;

$[k \times G-1, k \times G+4]$;

$[N_{RB}-N_{RB} \bmod G - a \times G, N_{RB}-1]$;

in which $G \in \{2, 3, 4\}$, $a \in \{0, 1, 2\}$, $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

In one embodiment, when one of the at least one narrowband is a downlink narrowband but not a downlink central narrowband, a value of G is associated with the system bandwidth.

In one embodiment, under the condition that one of the at least one narrowband is a downlink non-central narrowband, when a number of PRBs corresponding to the system bandwidth belongs to [11, 26], G=2 or when a number of PRBs corresponding to the system bandwidth belongs to [27, 63], G=3, or when a number of PRBs corresponding to the system bandwidth belongs to [64, 110], G=4.

In one embodiment, when G=4, multiple narrowbands allocated to the UE include at least one narrowband group. Each narrowband group consists of two successive narrowbands, each of the two successive narrowbands contains six successive PRBs, PRBs contained in the two successive narrowbands are not overlapped, and a PRB index interval of each narrowband group is [4×n, 4×n+11], n being a non-negative integer.

In one embodiment, when one of the at least one narrowband is a downlink narrowband but not a downlink central narrowband, and $N_{RB}$ is an odd number, a PRB index interval of one of the at least one narrowband is one of the following:

$$\left[\frac{N_{RB}-1}{2}-8-6n, \frac{N_{RB}-1}{2}-3-6n\right];$$

$$\left[\frac{N_{RB}-1}{2}+3+6n, \frac{N_{RB}-1}{2}+8+6n\right];$$

$$\left[\frac{N_{RB}-1}{2}-9-6n, \frac{N_{RB}-1}{2}-4-6n\right];$$

$$\left[\frac{N_{RB}-1}{2}+4+6n, \frac{N_{RB}-1}{2}+9+6n\right];$$

$$\left[0, \frac{N_{RB}-1}{2}-3-6n_1\right];$$

$$\left[\frac{N_{RB}-1}{2}+3+6n_1, N_{RB}-1\right];$$

$$\left[0, \frac{N_{RB}-1}{2}-4-6n_2\right];$$

$$\left[\frac{N_{RB}-1}{2}+4+6n_2, N_{RB}-1\right];$$

or when $N_{RB}$ is an even number, a PRB index interval of one of the at least one narrowband is one of the following:

$$[N_{RB}/2-9-6n, N_{RB}/2-4-6n];$$

$$[N_{RB}/2+3+6n, N_{RB}/2+8+6n];$$

$$\left[0, \frac{N_{RB}}{2}-4-6n_3\right];$$

$$\left[\frac{N_{RB}}{2}+3+6n_3, N_{RB}-1\right];$$

in which $N_{RB}$ is a number of PRBs corresponding to a system bandwidth, n is a non-negative integer, $$n_1 = \left\lceil\frac{N_{RB}-1}{12}-\frac{4}{3}\right\rceil, n_2 = \left\lceil\frac{N_{RB}-1}{12}-\frac{3}{2}\right\rceil, n_3 = \left\lceil\frac{N_{RB}}{12}-\frac{3}{2}\right\rceil,$$

and $\lceil \cdot \rceil$ is representative of rounding up to an integer.

In one embodiment, multiple narrowbands allocated to the UE include at least one narrowband group. Each narrowband group consists of two or more narrowbands, PRBs contained in adjacent narrowbands in each narrowband group are partially overlapped, and a PRB index interval of each narrowband group is [4×n, 4×n+b×G], n being a non-negative integer, and b being a positive integer.

In one embodiment, a number of PRBs spaced between narrowbands except a central narrowband or narrowband groups is an integral multiple of G.

In one embodiment, under the condition that the at least one PRB contained in part or all of the multiple narrowbands are partially overlapped, control information is mapped to part or all of resources of overlapped PRBs.

In one embodiment, when one of the at least one narrowband is a downlink narrowband, contents transmitted by the downlink narrowband include at least one of the following: downlink control information; and downlink data.

In one embodiment, when one of the at least one narrowband is an uplink narrowband, contents transmitted by the uplink narrowband include at least one of the following: a Physical Uplink Shared Channel (PUSCH); a Physical Uplink Control Channel (PUCCH); and a Physical Random Access Channel (PRACH).

In one embodiment, an allocation mode of the at least one narrowband includes one of the following: a pre-defined allocation mode; and an evolved Node B (eNB) notification-based allocation mode.

In one embodiment, an eNB notification-based allocation mode includes one of the following: an eNB performs notification by using cell-specific information; and an eNB performs notification by using UE-specific information.

In one embodiment, the eNB or the UE sends downlink or uplink information on the at least one narrowband in a frequency hopping manner.

In one embodiment, the eNB instructs the UE to allocate sub-frame information corresponding to the at least one narrowband.

In one embodiment, a Precoding Block Group (PRG) is determined by one of the at least one narrowband.

In one embodiment, in one of the at least one narrowband, every X successive PRBs, starting from a first PRB, constitute a PRG, when a modulus of M over X is greater than zero, a size of the last PRG is: $M-X\lfloor M/X \rfloor$. $\lfloor \cdot \rfloor$ is representative of rounding down to an integer, the first PRB is a PRB having lowest frequency or a PRB having highest frequency, and M is a number of PRBs contained in one of the at least one narrowband.

In one embodiment, factors for determining X include at least one of the following: a number of PRBs contained in one of the at least one narrowband, and a number of PRBs contained in a sub-band, corresponding to a system bandwidth where one of the at least one narrowband is located, for reporting a Channel Status Indicator (CSI).

In one embodiment, X satisfies one of the following conditions: condition 1: $X \in \{1, 2, 3, 4\}$; condition 2: X is M/2 or rounding down M/2 to an integer, or a positive integer smaller than or equal to M/2; condition 3: X is smaller than or equal to S/2 or rounding down S/2 to an integer, or a positive integer smaller than or equal to S/2. S is the number of the PRBs contained in the sub-band, corresponding to the system bandwidth where one of the at least one narrowband is located, for reporting a CSI; and condition 4: X obtained by any two of the condition 1, the condition 2 and the condition 3 is endowed with a maximum value.

In another embodiment of the disclosure, a method for acquiring narrowband allocation is provided, which includes that: acquiring at least one narrowband allocated by an evolved Node B (eNB). At least one Physical Resource Block (PRB) contained in each of the at least one narrowband is not overlapped, or at least one PRB contained in part or all of the at least one narrowband is partially overlapped.

In one embodiment, when one of the at least one narrowband is a downlink central narrowband, and $N_{RB}$ is an odd number, a PRB index interval of the downlink central narrowband is one of the following:

$[(N_{RB}-1)/2-2,(N_{RB}-1)/2+2];$ $[(N_{RB}-1)/2-3,(N_{RB}-1)/2+3];$ $[(N_{RB}-1)/2-3,(N_{RB}-1)/2+2];$ $[(N_{RB}-1)/2-2,(N_{RB}-1)/2+3];$ or when $N_{RB}$ is an even number, a PRB index interval of the central narrowband is: $[N_{RB}/2-3, N_{RB}/2+2]$. $N_{RB}$ is a number of PRBs corresponding to a system bandwidth, and a PRB index in the PRB index interval refers to the PRB index obtained by numbering, starting from zero, PRBs in a downlink system bandwidth according to an ascending order from lowest frequency to highest frequency.

In one embodiment, when one of the downlink narrowband is a downlink narrowband but not a downlink central narrowband or one of the at least one narrowband is an uplink narrowband, a PRB index interval of one of the at least one narrowband is one of the following:

$[k \times G, k \times G+5];$ $[k \times G-6, k \times G-1];$ $[k \times G-1, k \times G+4];$ $[N_{RB}-N_{RB} \bmod G-a \times G, N_{RB}-1];$ in which $G \in \{2, 3, 4\}$, $a \in \{0, 1, 2\}$, $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

In one embodiment, when one of the at least one narrowband is a downlink narrowband but not a downlink central narrowband, a value of G is associated with the system bandwidth.

In one embodiment, under the condition that one of the at least one narrowband is a downlink non-central narrowband, when a number of PRBs corresponding to the system bandwidth belongs to [11, 26], G=2, or when a number of PRBs corresponding to the system bandwidth belongs to [27, 63], G=3, or when a number of PRBs corresponding to the system bandwidth belongs to [64, 110], G=4.

In one embodiment, when G=4, multiple narrowbands allocated to the UE include at least one narrowband group. Each narrowband group consists of two successive narrowbands, each of the two successive narrowbands contains six successive PRBs, PRBs contained in the two successive narrowbands are not overlapped, and a PRB index interval of each narrowband group is [4×n, 4×n+11], n being a non-negative integer.

In one embodiment, when one of the at least one narrowband is a downlink narrowband but not a downlink central narrowband, and $N_{RB}$ is an odd number, a PRB index interval of one of the at least one narrowband is one of the following:

$\left[\frac{N_{RB}-1}{2} - 8 - 6n, \frac{N_{RB}-1}{2} - 3 - 6n\right];$ $\left[\frac{N_{RB}-1}{2} + 3 + 6n, \frac{N_{RB}-1}{2} + 8 + 6n\right];$ $\left[\frac{N_{RB}-1}{2} - 9 - 6n, \frac{N_{RB}-1}{2} - 4 - 6n\right];$ $\left[\frac{N_{RB}-1}{2} + 4 + 6n, \frac{N_{RB}-1}{2} + 9 + 6n\right];$ $\left[0, \frac{N_{RB}-1}{2} - 3 - 6n_1\right];$ $\left[\frac{N_{RB}-1}{2} + 3 + 6n_1, N_{RB} - 1\right];$ $\left[0, \frac{N_{RB}-1}{2} - 4 - 6n_2\right];$ $\left[\frac{N_{RB}-1}{2} + 4 + 6n_2, N_{RB} - 1\right];$ or when $N_{RB}$ is an even number, a PRB index interval of one of the at least one narrowband is one of the following:

$[N_{RB}/2 - 9 - 6n, N_{RB}/2 - 4 - 6n];$ $[N_{RB}/2 + 3 + 6n, N_{RB}/2 + 8 + 6n];$ $\left[0, \frac{N_{RB}}{2} - 4 - 6n_3\right];$ $\left[\frac{N_{RB}}{2} + 3 + 6n_3, N_{RB} - 1\right];$ in which $N_{RB}$ is a number of PRBs corresponding to a system bandwidth, n is a non-negative integer, $n_1 = \left\lceil \frac{N_{RB}-1}{12} - \frac{4}{3} \right\rceil, n_2 = \left\lceil \frac{N_{RB}-1}{12} - \frac{3}{2} \right\rceil, n_3 = \left\lceil \frac{N_{RB}}{12} - \frac{3}{2} \right\rceil,$ and $\lceil \cdot \rceil$ is representative of rounding up to an integer.

In one embodiment, multiple narrowbands allocated to the UE include at least one narrowband group. Each narrowband group consists of two or more narrowbands, PRBs contained in adjacent narrowbands in each narrowband group are partially overlapped, and a PRB index interval of each narrowband group is [4×n, 4×n+b×G], n being a non-negative integer, and b being a positive integer.

In one embodiment, a number of PRBs spaced between narrowbands except a central narrowband or narrowband groups is an integral multiple of G.

In one embodiment, under the condition that the at least one PRB contained in part or all of the multiple narrowbands are partially overlapped, control information is mapped to part or all of resources of overlapped PRBs.

In one embodiment, a Precoding Block Group (PRG) is determined by one of the at least one narrowband.

In one embodiment, in one of the at least one narrowband, every X successive PRBs, starting from a first PRB, constitute a PRG, when a modulus of M over X is greater than zero, a size of the last PRG is: $M-X\lfloor M/X \rfloor$. $\lfloor \bullet \rfloor$ is representative of rounding down to an integer, the first PRB is a PRB having lowest frequency or a PRB having highest frequency, and M is a number of PRBs contained in one of the at least one narrowband.

In one embodiment, factors for determining X include at least one of the following: a number of PRBs contained in one of the at least one narrowband, and a number of PRBs contained in a sub-band, corresponding to a system bandwidth where one of the at least one narrowband is located, for reporting a Channel Status Indicator (CSI).

In one embodiment, X satisfies one of the following conditions: condition 1: $X \in \{1, 2, 3, 4\}$; condition 2: X is M/2 or rounding down M/2 to an integer, or a positive integer smaller than or equal to M/2; condition 3: X is smaller than or equal to S/2 or rounding down S/2 to an integer, or a positive integer smaller than or equal to S/2. S is the number of the PRBs contained in the sub-band, corresponding to the system bandwidth where one of the at least one narrowband is located, for reporting a CSI; and condition 4: X obtained by any two of the condition 1, the condition 2 and the condition 3 is endowed with a maximum value.

In another embodiment of the disclosure, a device for narrowband allocation is provided, which includes: an allocation component to allocate at least one narrowband to a User Equipment (UE). At least one Physical Resource Block (PRB) contained in each of the at least one narrowband is not overlapped, or at least one PRB contained in part or all of the at least one narrowband is partially overlapped.

In one embodiment, when one of the at least one narrowband is a downlink central narrowband, and $N_{RB}$ is an odd number, a PRB index interval of the downlink central narrowband is one of the following:

[$(N_{RB}-1)/2-2, (N_{RB}-1)/2+2$];

[$(N_{RB}-1)/2-3, (N_{RB}-1)/2+3$];

[$(N_{RB}-1)/2-3, (N_{RB}-1)/2+2$];

[$(N_{RB}-1)/2-2, (N_{RB}-1)/2+3$];

or when $N_{RB}$ is an even number, a PRB index interval of the central narrowband is: [$N_{RB}/2-1, N_{RB}/2+2$]. $N_{RB}$ is a number of PRBs corresponding to a system bandwidth, and a PRB index in the PRB index interval refers to the PRB index obtained by numbering, starting from zero, PRBs in a downlink system bandwidth according to an ascending order from lowest frequency to highest frequency.

In one embodiment, when one of the at least one narrowband is a downlink narrowband but not a downlink central narrowband or one of the at least one narrowband is an uplink narrowband, a PRB index interval of this narrowband or one of the at least one narrowband is one of the following:

[$k \times G, k \times G + 5$];

[$k \times G - 6, k \times G - 1$];

[$k \times G - 1, k \times G + 4$];

[$N_{RB} - N_{RB} \bmod G - a \times G, N_{RB} - 1$];

in which $G-\{2, 3, 4\}$, $a \in \{0, 1, 2\}$, $N_{RB}$ is a number of PRBs corresponding to a system bandwidth, a PRB index, for downlink, in the PRB index interval refers to a the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

In one embodiment, when one of the at least one narrowband is a downlink narrowband but not a downlink central narrowband, a value of G is associated with the system bandwidth.

In one embodiment, under the condition that one of the at least one narrowband is a downlink non-central narrowband, when a number of PRBs corresponding to the system bandwidth belongs to [11, 26], G=2, or when a number of PRBs corresponding to the system bandwidth belongs to [27, 63], G=3, or when a number of PRBs corresponding to the system bandwidth belongs to [64, 110], G=4.

In one embodiment, when G=4, the multiple narrowbands allocated to the UE include at least one narrowband group. Each narrowband group consists of two successive narrowbands, each of the two successive narrowbands contains six successive PRBs, PRBs contained in the two successive narrowbands are not overlapped, and a PRB index interval of each narrowband group is [4×n, 4×n+11], n being a non-negative integer.

In one embodiment, when one of the at least one narrowband is a downlink narrowband but not a downlink central narrowband, and $N_{RB}$ is an odd number, a PRB index interval of one of the at least one narrowband is one of the following:

$$\left[\frac{N_{RB}-1}{2} - 8 - 6n, \frac{N_{RB}-1}{2} - 3 - 6n\right];$$

$$\left[\frac{N_{RB}-1}{2} + 3 + 6n, \frac{N_{RB}-1}{2} + 8 + 6n\right];$$

$$\left[\frac{N_{RB}-1}{2} - 9 - 6n, \frac{N_{RB}-1}{2} - 4 - 6n\right];$$

$$\left[\frac{N_{RB}-1}{2} + 4 + 6n, \frac{N_{RB}-1}{2} + 9 + 6n\right];$$

$$\left[0, \frac{N_{RB}-1}{2} - 3 - 6n_1\right];$$

$$\left[\frac{N_{RB}-1}{2} + 3 + 6n_1, N_{RB} - 1\right];$$

$$\left[0, \frac{N_{RB}-1}{2} - 4 - 6n_2\right];$$

$$\left[\frac{N_{RB}-1}{2} + 4 + 6n_2, N_{RB} - 1\right];$$

or when $N_{RB}$ is an even number, a PRB index interval of one of the at least one narrowband is one of the following:

$$[N_{RB}/2 - 9 - 6n, N_{RB}/2 - 4 - 6n];$$

$$[N_{RB}/2 + 3 + 6n, N_{RB}/2 + 8 + 6n];$$

$$\left[0, \frac{N_{RB}}{2} - 4 - 6n_3\right];$$

$$\left[\frac{N_{RB}}{2} + 3 + 6n_3, N_{RB} - 1\right];$$

in which $N_{RB}$ is a number of PRBs corresponding to a system bandwidth, n is a non-negative integer, $$n_1 = \left\lceil \frac{N_{RB}-1}{12} - \frac{4}{3} \right\rceil, \; n_2 = \left\lceil \frac{N_{RB}-1}{12} - \frac{3}{2} \right\rceil, \; n_3 = \left\lceil \frac{N_{RB}}{12} - \frac{3}{2} \right\rceil,$$

and ⌈•⌉ is representative of rounding up to an integer.

In one embodiment, multiple narrowbands allocated to the UE include at least one narrowband group. Each narrowband group consists of two or more narrowbands, PRBs contained in adjacent narrowbands in each narrowband group are partially overlapped, and a PRB index interval of each narrowband group is [4×n, 4×n+11b×G], n being a non-negative integer, and b being a positive integer.

In one embodiment, a number of PRBs spaced between narrowbands except a central narrowband or narrowband groups is an integral multiple of G.

In one embodiment, under the condition that the at least one PRB contained in part or all of the multiple narrowbands are partially overlapped, control information is mapped to part or all of resources of overlapped PRBs.

In one embodiment, when one of the at least one narrowband is a downlink narrowband, contents transmitted by the downlink narrowband include at least one of the following: downlink control information; and downlink data.

In one embodiment, when one of at least one narrowband is an uplink narrowbands, contents transmitted by the uplink narrowbands include at least one of the following: a Physical Uplink Shared Channel (PUSCH); a Physical Uplink Control Channel (PUCCH); and a Physical Random Access Channel (PRACH).

In one embodiment, an allocation mode of the at least one narrowband includes one of the following: a pre-defined allocation mode; and an evolved Node B (eNB) notification-based allocation mode.

In one embodiment, an eNB notification-based allocation mode includes one of the following: an eNB performs notification by using cell-specific information; and an eNB performs notification by using UE-specific information.

In one embodiment, a Precoding Block Group (PRG) is determined by one of the at least one narrowband.

In one embodiment, in one of the at least one narrowband, every X successive PRBs, starting from a first PRB, constitute a PRG, when a modulus of M over X is greater than zero, a size of the last PRG is: M−X⌊M/X⌋. ⌊•⌋ is representative of rounding down to an integer, the first PRB is a PRB having lowest frequency or a PRB having highest frequency, and M is a number of PRBs contained in one of the at least one narrowband.

In one embodiment, factors for determining X include at least one of the following: a number of PRBs contained in one of the at least one narrowband, and a number of PRBs contained in a sub-band, corresponding to a system bandwidth where one of the at least one narrowband is located, for reporting a Channel Status Indicator (CSI).

In one embodiment, X satisfies one of the following conditions: condition 1: X∈{1, 2, 3, 4}, condition 2: X is M/2 or rounding down M/2 to an integer, or a positive integer smaller than or equal to M/2; condition 3: X is smaller than or equal to S/2 or rounding down S/2 to an integer, or a positive integer smaller than or equal to S/2. S is the number of the PRBs contained in the sub-band, corresponding to the system bandwidth where one of the at least one narrowband is located, for reporting a CSI, and condition 4: X obtained by any two of the condition 1, the condition 2 and the condition 3 is endowed with a maximum value.

In another embodiment of the disclosure, a device for acquiring narrowband allocation is provided, which includes: an acquisition component to acquire at least one narrowband allocated by an evolved Node B (eNB). At least one Physical Resource Block (PRB) contained in each of the at least one narrowband is not overlapped, or at least one PRB contained in part or all of the at least one narrowband is partially overlapped.

By means of the at least some embodiments of the disclosure, at least one narrowband is allocated to a User Equipment (UE), and at least one Physical Resource Block (PRB) contained in each of the at least one narrowband is not overlapped, or at least one PRB contained in part or all of the at least one narrowband is partially overlapped. The problem that the solution involved in the narrowband allocation mode has not been provided yet is solved, so overheads of indicating uplink and downlink resource allocations can be reduced. Moreover, a downlink narrowband neither splits an RBG nor causes an effect on scheduling of a legacy UE, and an uplink narrowband contains an SRS bandwidth having four PRBs, so that an eNB can schedule the UE to send data without giving up sending an SRS.

BRIEF DESCRIPTION OF THE DRAWINGS

FIG. 1 is a flowchart of a method for narrowband allocation according to an embodiment of the disclosure.

FIG. 2 is a diagram of a central narrowband having a PRB index interval [($N_{RB}$−1)/2−2, ($N_{RB}$−1)/2+2] according to an exemplary embodiment of the disclosure.

FIG. 3 is a diagram of a central narrowband having a PRB index interval [($N_{RB}$−1)/2−3, ($N_{RB}$−1)/2+3] according to an exemplary embodiment of the disclosure.

FIG. 24 is a diagram of PRACH and PUCCH narrowbands when a narrowband starting PRB index in an SRS bandwidth is $\lfloor N_{RB}^{UL}/2 \rfloor - m_{SRS,0}/2+4k-1$ and narrowbands are not overlapped according to an exemplary embodiment of the disclosure.

FIG. 25 is a diagram of PRACH and PUCCH narrowbands when a narrowband starting PRB index in an SRS bandwidth is $\lfloor N_{RB}^{UL}/2 \rfloor - m_{SRS,0}/2+4k-1$ and narrowbands are overlapped according to an exemplary embodiment of the disclosure.

FIG. 26 is a flowchart of a method for acquiring narrowband allocation according to an embodiment of the disclosure.

FIG. 27 is a structural block diagram of a device for narrowband allocation according to an embodiment of the disclosure.

FIGS. 28-29 each show a structural block diagram of a device for acquiring narrowband allocation according to an embodiment of the disclosure.

DETAILED DESCRIPTION

Figure 4:
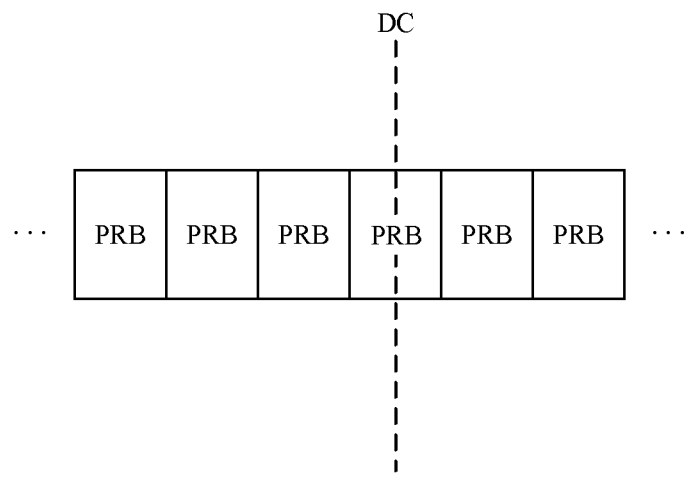
FIG. 4 is a diagram of a central narrowband having a PRB index interval [($N_{RB}$−1)/2−3, ($N_{RB}$−1)/2+2] according to an exemplary embodiment of the disclosure.

The disclosure will be illustrated herein below with reference to the drawings and in conjunction with the embodiments in detail. It is important to note that embodiments in the present application and features in the embodiments are combined under the condition of no conflicts.

FIG. 1 is a flowchart of a method for narrowband allocation according to an embodiment of the disclosure. As shown in FIG. 1, the method includes the following processing step.

At Step S102: At least one narrowband is allocated to a UE, in which at least one PRB contained in each of the at least one narrowband is not overlapped, or at least one PRB contained in part or all of the at least one narrowband is partially overlapped.

It is important to note that 'PRBs are not overlapped' refers to that identical PRBs do not exist between narrowbands. For example, if a PRB index interval of a narrowband is [0, 5], and a PRB index interval of another narrowband is [6, 11], PRBs contained in the two narrowbands are not overlapped. 'PRBs are partially overlapped' refers to that PRBs between narrowbands are partially identical. For example, if a PRB index interval of a narrowband is [0, 5], and a PRB index interval of another narrowband is [4, 9], PRBs contained in the two narrowbands are partially overlapped, the overlapped PRB indexes being 4 and 5.

A narrowband allocation mode provided in some situations is relatively single, and low in flexibility. By means of the method as shown in FIG. 1, a working band of a UE supporting an RF bandwidth smaller than a system bandwidth may be referred to as a narrowband, applied to, not limited to, an MTC UE. At least one of Uplink and downlink narrowbands is allocated by means of an RBG or an SRS sending position. Therefore, the problems of relatively single narrowband allocation mode and low flexibility are solved, thus reducing overheads of indicating resource allocations. An RBG is not split, and an effect is not caused on scheduling of a legacy UE.

In an exemplary embodiment, when one of the at least one narrowband is a downlink central narrowband and $N_{RB}$ is an odd number, a PRB index interval of the downlink central narrowband is one of the following:

$$[(N_{RB}-1)/2-2, (N_{RB}-1)/2+2]; \quad (1)$$

$$[(N_{RB}-1)/2-3, (N_{RB}-1)/2+3]; \quad (2)$$

$$[(N_{RB}-1)/2-3, (N_{RB}-1)/2+2]; \quad (3)$$

$$[(N_{RB}-1)/2-2, (N_{RB}-1)/2+3]; \quad (4)$$

or when $N_{RB}$ is an even number, a PRB index interval of the central narrowband is: $[N_{RB}/2-3, N_{RB}/2+2]$;

in which a PRB index in the PRB index interval refers to the PRB index obtained by numbering, starting from zero, PRBs in a downlink system bandwidth according to an ascending order from lowest frequency to highest frequency. Moreover, $N_{RB}$ is a number of PRBs corresponding to a system bandwidth. And the number of PRBs $N_{RB}$ corresponding to each system bandwidth is as shown in Table 1.

TABLE 1

| | System bandwidth BW [MHz] | | | | | |
|---|---|---|---|---|---|---|
| | 1.4 | 3 | 5 | 10 | 15 | 20 |
| $N_{RB}$ | 6 | 15 | 25 | 50 | 75 | 100 |

In an exemplary embodiment, when one of the at least one narrowband is a downlink narrowband but not a downlink central narrowband or one of the at least one narrowband is an uplink narrowband, a PRB index interval of one of the at least one narrowband is one of the following:

$$[k \times G, k \times G+5]; \quad (1)$$

$$[k \times G-6, k \times G-1]; \quad (2)$$

$$[k \times G-1, k \times G+4]; \quad (3)$$

$$[N_{RB}-N_{RB} \bmod G-a \times G, N_{RB}-1]; \quad (4)$$

in which $G \in \{2, 3, 4\}$, k is an integer, $a \in \{0, 1, 2\}$. A PRB index, for downlink, in the PRB index interval refers to the PRB index obtained by numbering, starting from zero, PRBs in the system bandwidth according to an ascending order from lowest frequency to highest frequency. A PRB index, for uplink, in the PRB index interval refers to the PRB index obtained by numbering, starting from zero, PRBs in an SRS bandwidth of a cell according to an ascending order from lowest frequency to highest frequency. And PRB indexes of PRBs having frequency lower than lowest frequency of the SRS bandwidth are −1, −2, . . . from highest frequency to lowest frequency, and k is a non-negative integer. The value of k, for downlink, satisfies that the PRB index interval is within an interval [0, $N_{RB}$−1]. For example, the value of k shall be a non-negative integer not greater than $$\frac{N_{RB} - 6}{G}$$

for a PRB index interval [k×G, k×G+5]. The value of k, for uplink, satisfies that the PRB index interval is within an interval [−1, $N_{SRS}$]. $N_{SRS}$ is the number of PRBs contained in the SRS bandwidth of the cell. For example, the value of k shall be a non-negative integer not greater than $$\frac{N_{SRS} - 4}{G}$$

for a PRB index interval [k×G−1, k×G+4].

In an exemplary embodiment, when one of the at least one narrowband is a downlink narrowband but not a downlink central narrowband, and a value of G is associated with the system bandwidth.

In an exemplary embodiment, under the condition that one of the at least one narrowband is a downlink non-central narrowband, when a number of PRBs corresponding to the system bandwidth belongs to [11, 26], G=2 or when a number of PRBs corresponding to the system bandwidth belongs to [27, 63], G=3, or when a number of PRBs corresponding to the system bandwidth belongs to [64, 110], G=4.

In an exemplary embodiment, when G=4, multiple narrowbands allocated to the UE comprise at least one narrowband group. Each narrowband group consists of two successive narrowbands, each of the two successive narrowbands contains six successive PRBs, PRBs contained in the two successive narrowbands are not overlapped, and a PRB index interval of each narrowband group is [4×n, 4×n+11], n being a non-negative integer. The value of n, for downlink, satisfies that the PRB index interval is within an interval [0, $N_{RB}$−1]. And the value of n, for uplink, satisfies that the PRB index interval is within an interval [−1, $N_{SRS}$].

In an exemplary embodiment, when one of the at least one narrowband is a downlink narrowband but not a downlink central narrowband, and $N_{RB}$ is an odd number, a PRB index interval of one of the at least one narrowband is one of the following:

$$\left[\frac{N_{RB}-1}{2}-8-6n, \frac{N_{RB}-1}{2}-3-6n\right]; \quad (1)$$

$$\left[\frac{N_{RB}-1}{2}+3+6n, \frac{N_{RB}-1}{2}+8+6n\right]; \quad (2)$$

$$\left[\frac{N_{RB}-1}{2}-9-6n, \frac{N_{RB}-1}{2}-4-6n\right]; \quad (3)$$

$$\left[\frac{N_{RB}-1}{2}+4+6n, \frac{N_{RB}-1}{2}+9+6n\right]; \quad (4)$$

$$\left[0, \frac{N_{RB}-1}{2}-3-6n_1\right]; \quad (5)$$

$$\left[\frac{N_{RB}-1}{2}+3+6n_1, N_{RB}-1\right]; \quad (6)$$

$$\left[0, \frac{N_{RB}-1}{2}-4-6n_2\right]; \quad (7)$$

$$\left[\frac{N_{RB}-1}{2}+4+6n_2, N_{RB}-1\right]; \quad (8)$$

or when $N_{RB}$ is an even number, a PRB index interval of one of the at least one narrowband is one of the following:

$$[N_{RB}/2-9-6n, N_{RB}/2-4-6n]; \quad (1)$$

$$[N_{RB}/2+3+6n, N_{RB}/2+8+6n]; \quad (2)$$

$$\left[0, \frac{N_{RB}}{2}-4-6n_3\right]; \quad (3)$$

$$\left[\frac{N_{RB}}{2}+3+6n_3, N_{RB}-1\right]; \quad (4)$$

in which $N_{RB}$ is a number of PRBs corresponding to a system bandwidth, n is a non-negative integer, $$n_1 = \left\lceil\frac{N_{RB}-1}{12}-\frac{4}{3}\right\rceil, n_2 = \left\lceil\frac{N_{RB}-1}{12}-\frac{3}{2}\right\rceil, n_3 = \left\lceil\frac{N_{RB}}{12}-\frac{3}{2}\right\rceil,$$

and ⌈•⌉ is representative of rounding up to an integer. The PRB index interval is within an interval [0, $N_{RB}$−1].

In an exemplary embodiment, multiple narrowbands allocated to the UE comprise at least one narrowband group. Each narrowband group consists of two or more narrowbands, PRBs contained in adjacent narrowbands in each narrowband group are partially overlapped, and a PRB index interval of each narrowband group is [4×n, 4×n+b×G], n being a non-negative integer, and b being a positive integer. The PRB index interval, for downlink, is within an interval [0, $N_{RB}$−1]. The PRB index interval, for uplink, is within an interval [−1, $N_{SRS}$].

In an exemplary embodiment, a number of PRBs spaced between narrowbands except a central narrowband or narrowband groups is an integral multiple of G.

In an exemplary embodiment, under the condition that the at least one PRB contained in part or all of the multiple narrowbands are partially overlapped, control information is mapped to part or all of resources of overlapped PRBs.

In an exemplary embodiment, when one of the at least one narrowband is a downlink narrowband, contents transmitted by the downlink narrowband comprise at least one of the following:

(1) downlink control information, which includes, but is not limited to, an Enhanced-Physical Downlink Control Channel (E-PDCCH); and (2) downlink data, which includes, but is not limited to, information transmitted over a Physical Downlink Shared Channel (PDSCH).

In an exemplary embodiment, when one of the at least one narrowband is an uplink narrowband, contents transmitted by the uplink narrowband comprise at least one of the following:

(1) a PUSCH;
(2) a PUCCH; and
(3) a PRACH.

In an exemplary embodiment, an allocation mode of at least one narrowband includes one of the following: a pre-defined allocation mode and an eNB notification-based allocation mode.

In an exemplary embodiment, an eNB notification-based allocation mode includes one of the following:
(1) an eNB performs notification by using cell-specific information; and
(2) an eNB performs notification by using UE-specific information.

In an exemplary embodiment, the eNB or the UE sends downlink or uplink information on the at least one narrowband in a frequency hopping manner.

In an exemplary embodiment, the eNB instructs the UE to allocate sub-frame information corresponding to the at least one narrowband.

In an exemplary embodiment, a PRG may be determined by one of the at least one narrowband.

In an exemplary embodiment, in one of the at least one narrowband, every X successive PRBs, starting from a first PRB, constitute a PRG, when a modulus of M over X is greater than zero, a size of the last PRG is: M−X⌊M/X⌋, ⌊•⌋ is representative of rounding down to an integer. The first PRB is a PRB having lowest frequency or a PRB having highest frequency. And M is a number of PRBs contained in one of the at least one narrowband.

In an exemplary embodiment, factors for determining X include, but are not limited to, at least one of the following:
(1) a number of PRBs contained in one of the at least one narrowband, and
(2) a number of PRBs contained in a sub-band, corresponding to a system bandwidth where one of the at least one narrowband is located, for reporting a CSI.

In an exemplary embodiment, X satisfies one of the following conditions:
condition 1: X∈{1, 2, 3, 4};
condition 2: X is M/2 or rounding down M/2 to an integer, or a positive integer smaller than or equal to M/2;
condition 3: X is smaller than or equal to S/2 or rounding down S/2 to an integer, or a positive integer smaller than or equal to S/2. S is the number of the PRBs contained in the sub-band, corresponding to the system bandwidth where one of the at least one narrowband is located, for reporting a CSI, and
condition 4: X obtained by any two of the condition 1, the condition 2 and the condition 3 is endowed with a maximum value.

The above-mentioned exemplary implementation process will be further described herein below with the following preferable embodiments.

First Exemplary Embodiment

FIG. 2 is a diagram of a central narrowband having a PRB index interval [($N_{RB}$−1)/2−2, ($N_{RB}$−1)/2+2] according to an exemplary embodiment of the disclosure. As shown in FIG. 2, an eNB allocates at least one narrowband to a UE. If a downlink central narrowband is allocated and $N_{RB}$ configured by a system bandwidth is an odd number, namely the system bandwidth is 3 MHz or 5 MHz or 15 MHz, the central narrowband is five PRBs of a system bandwidth center, namely a PRB index interval is [($N_{RB}$−1)/2−2, ($N_{RB}$−1)/2+2]. PRB index intervals corresponding to 3 MHz, 5 MHz and 15 MHz respectively are [5, 9], [10, 14] and [35, 39].

FIG. 3 is a diagram of a central narrowband having a PRB index interval [($N_{RB}$−1)/2−3, ($N_{RB}$−1)/2+3] according to an exemplary embodiment of the disclosure. As shown in FIG. 3, a central narrowband is seven PRBs of a system bandwidth center, namely a PRB index interval is [($N_{RB}$−1)/2−3, ($N_{RB}$−1)/2+3].

Figure 5:
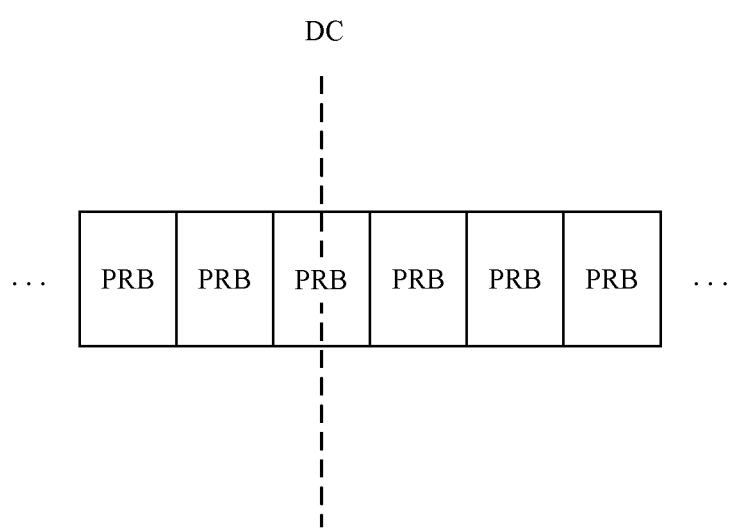
FIG. 5 is a diagram of a central narrowband having a PRB index interval [($N_{RB}$−1)/2−2, ($N_{RB}$−1)/2+3] according to an exemplary embodiment of the disclosure.

FIG. 4 is a diagram of a central narrowband having a PRB index interval [($N_{RB}$−1)/2−3, ($N_{RB}$−1)/2+2] according to an exemplary embodiment of the disclosure. FIG. 5 is a diagram of a central narrowband having a PRB index interval [($N_{RB}$−1)/2−2, ($N_{RB}$−1)/2+3] according to an exemplary embodiment of the disclosure. As shown in FIG. 4 and FIG. 5, PRB index intervals corresponding to 3 MHz, 5 MHz and 15 MHz respectively are [4, 10], [9, 15] and [34, 40], marginal PRBs may be not fully occupied, and part of REs is occupied. Or, a central narrowband is six PRBs of a system bandwidth center, namely a PRB index interval is [($N_{RB}$−1)/2−3, ($N_{RB}$−1)/2+2] or [($N_{RB}$−1)/2−2, ($N_{RB}$−1)/2+3]. A PRB index interval corresponding to 3 MHz is [5, 10] or [4, 9], a PRB index interval corresponding to 5 MHz is [9, 14] or [10, 15], and a PRB index interval corresponding to 15 MHz is [34, 39] or [35, 40]. $N_{RB}$ is a PRB number corresponding to a downlink system bandwidth, and $N_{RB}^{DL}$ corresponding to system bandwidths 3 MHz, 5 MHz, 10 MHz, 15 MHz and 20 MHz is 15, 25, 50, 75 and 100.

Figure 6:
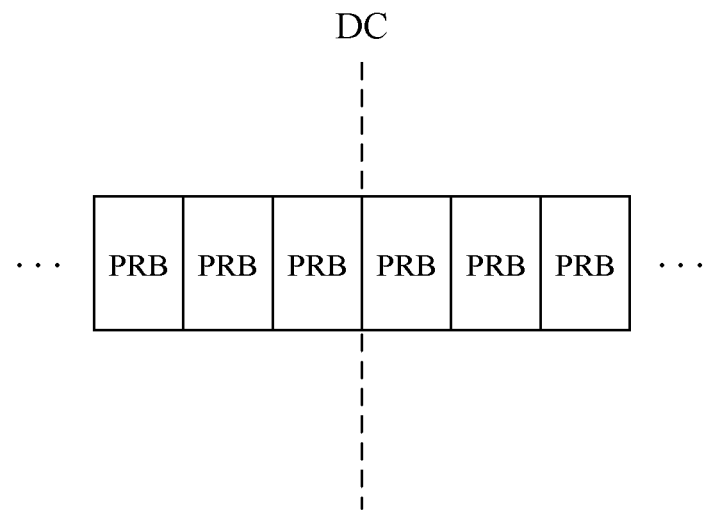
FIG. 6 is a diagram of a central narrowband having a PRB index interval [$N_{RB}$/2−3, $N_{RB}$/2+2] according to an exemplary embodiment of the disclosure.

FIG. 6 is a diagram of a central narrowband having a PRB index interval [$N_{RB}$/2−3, $N_{RB}$/2+2] according to an exemplary embodiment of the disclosure. As shown in FIG. 6, if a downlink central narrowband is allocated and $N_{RB}$ configured by a system bandwidth is an even number, namely the system bandwidth is 10 MHz or 20 MHz, the central narrowband is six PRBs of a system bandwidth center, namely a PRB interval of the central narrowband is [$N_{RB}$/2−3, $N_{RB}$/2+2]. Moreover, PRB index intervals corresponding to system bandwidths 10 MHz and 20 MHz are respectively [22, 27] and [47, 52].

If an allocated narrowband is not a downlink central narrowband, a starting PRB index of the narrowband is k×G, or an index of a PRB having highest frequency is k×G−1. G∈{2, 3, 4}, and k is an integer. The PRB index interval is within [0, $N_{RB}$−1]. The PRB index interval of the narrowband is: [k×G, k×G+5] or [k×G−6, k×G−1]. The value of G is associated with the system bandwidth. When the PRB number corresponding to the system bandwidth belongs to [11, 26], G=2. Or when the PRB number corresponding to the system bandwidth belongs to [27, 63], G=3. Or when the PRB number corresponding to the system bandwidth belongs to [64, 110], G=4. The value of G is the number of PRBs contained in an RBG corresponding to the system bandwidth. The narrowband is allocated in such manner, so at least one end of the narrowband can be aligned with an RBG, and the narrowband tries to avoid splitting the RBG and does not cause an effect on scheduling of a legacy UE.

Figure 7:
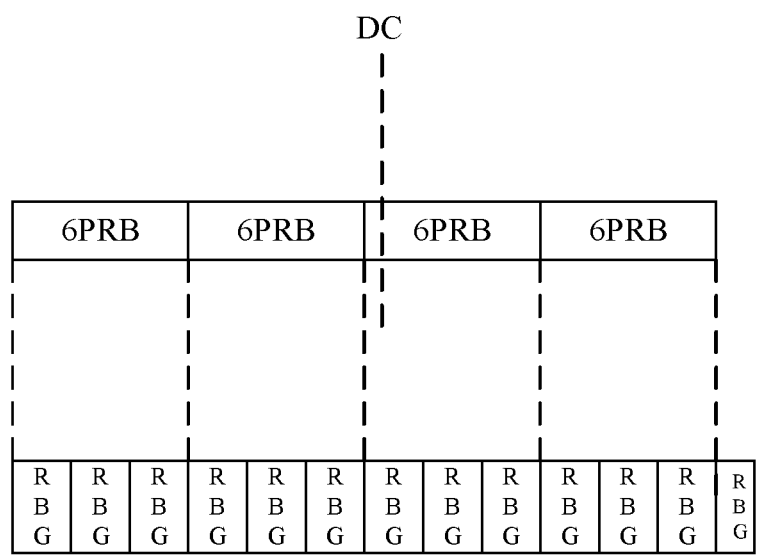
FIG. 7 is a diagram of a narrowband where G=2 according to an exemplary embodiment of the disclosure.
Figure 8:
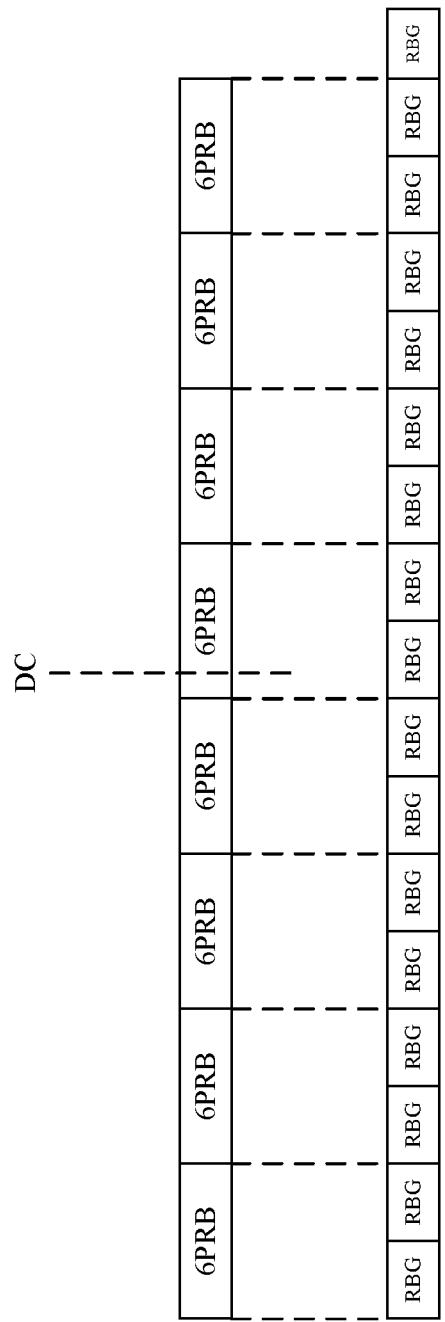
FIG. 8 is a diagram of a narrowband where G=3 according to an exemplary embodiment of the disclosure.
Figure 9:
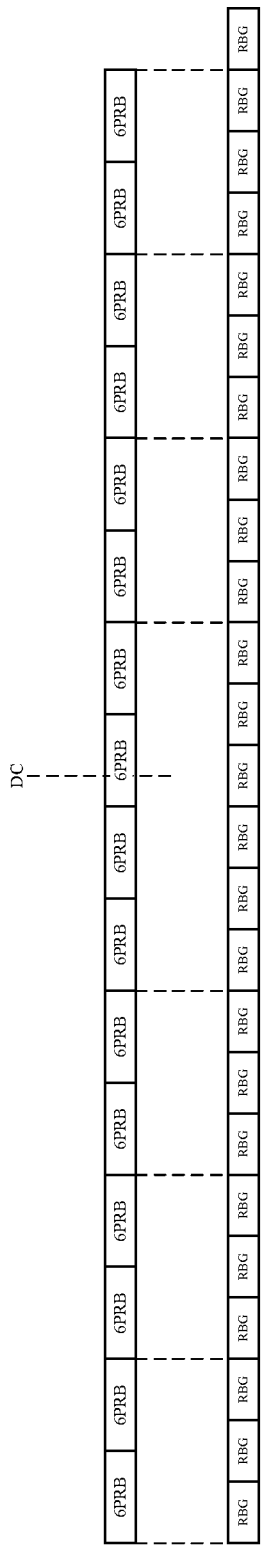
FIG. 9 is a diagram of a narrowband where G=4 according to an exemplary embodiment of the disclosure.

FIG. 7 is a diagram of a narrowband where G=2 according to an exemplary embodiment of the disclosure. FIG. 8 is a diagram of a narrowband where G=3 according to an exemplary embodiment of the disclosure. FIG. 9 is a diagram of a narrowband where G=4 according to an exemplary embodiment of the disclosure. As shown in FIG. 7 to FIG. 9, diagrams of an RBG or a narrowband having six PRBs allocated when G is equal to 2, 3 and 4 are provided respectively. Narrowbands allocated to a UE are all or part of these narrowbands. Less than six marginal PRBs may constitute a narrowband allocated to the UE. The remaining RBG at a margin in FIG. 7 to FIG. 9 is a narrowband allocated to the UE, and a PRB index interval of the narrowband is: [$N_{RB}$ mod G+a×G, $N_{RB}$−1]. $N_{RB}$ is a PRB number corresponding to a downlink system bandwidth, a∈{0, 1, 2}, and a=0 in FIG. 7 to FIG. 9.

Figure 10:
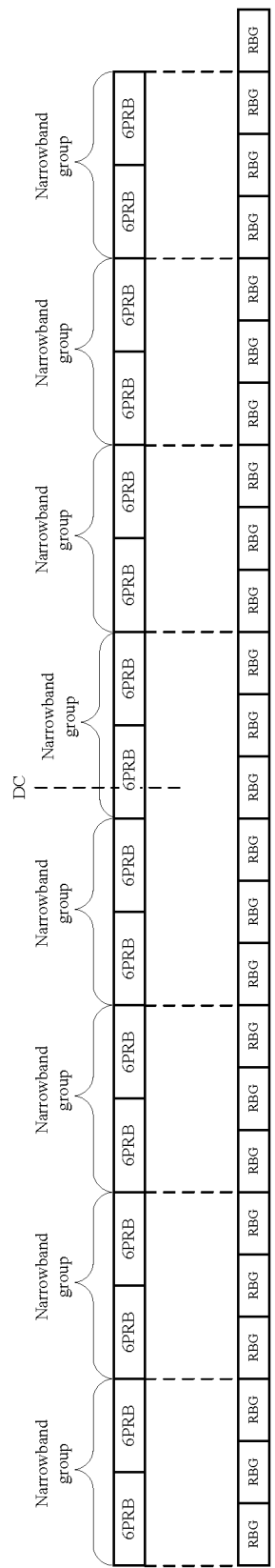
FIG. 10 is a diagram of a narrowband group according to an exemplary embodiment of the disclosure.

When an eNB allocates multiple narrowbands to the UE, all of the multiple narrowbands are not overlapped, as shown in FIG. 7 to FIG. 9. When G=4, two successive narrowbands having six PRBs, and a PRB index interval of a narrowband group is [4×n, 4×n+11], n being a non-negative integer. FIG. 10 is a diagram of a narrowband group according to an exemplary embodiment of the disclosure. As shown in FIG. 10, every two narrowbands constitute a narrowband group from lowest frequency to highest frequency, the narrowband groups being not overlapped. Therefore, it is ensured that two ends of the narrowband group are aligned with an RBG respectively, thus neither splitting the RBG nor causing an effect on scheduling of a legacy UE. In an exemplary implementation process, when the narrowband is allocated to the UE, the whole narrowband group may be allocated to the UE.

Further, the number of PRBs spaced between the narrowband groups shall be an integral multiple of G. 'Spacing' here refers to a PRB between a PRB, having highest frequency, of a low-frequency narrowband and a PRB, having lowest frequency, of a high-frequency narrowband. If a PRB index of a narrowband is [0, 5] and a PRB index of another narrowband is [8, 13], spacing is two PRBs namely PRB#6 and PRB7.

Figure 11:
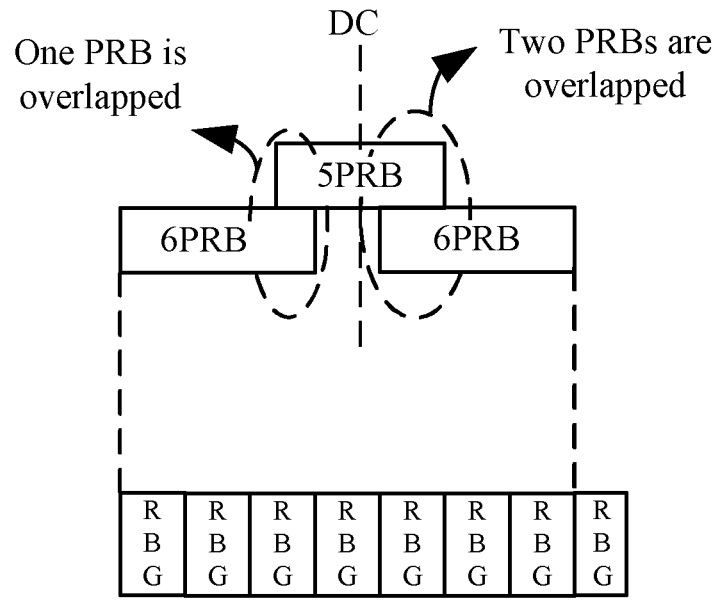
FIG. 11 is a diagram of a narrowband group at a central frequency when a system bandwidth is 3 MHz according to an exemplary embodiment of the disclosure.
Figure 12:
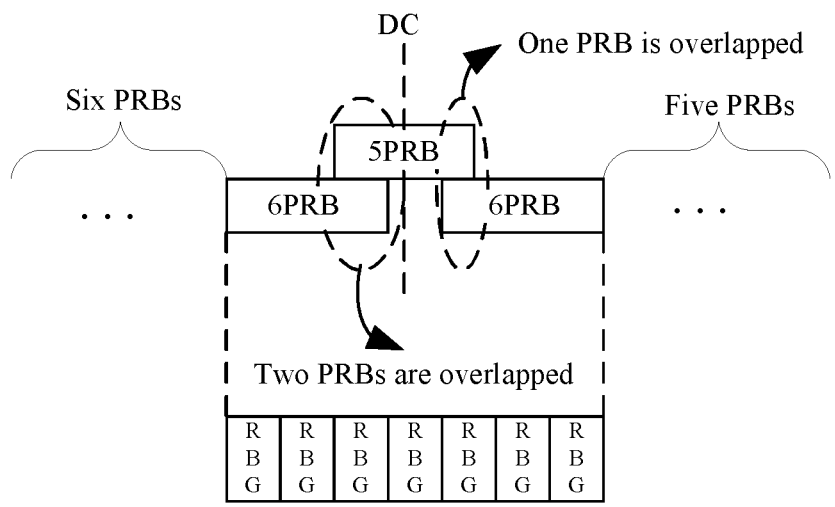
FIG. 12 is a diagram of a narrowband group at a central frequency when a system bandwidth is 5 MHz according to an exemplary embodiment of the disclosure.
Figure 13:
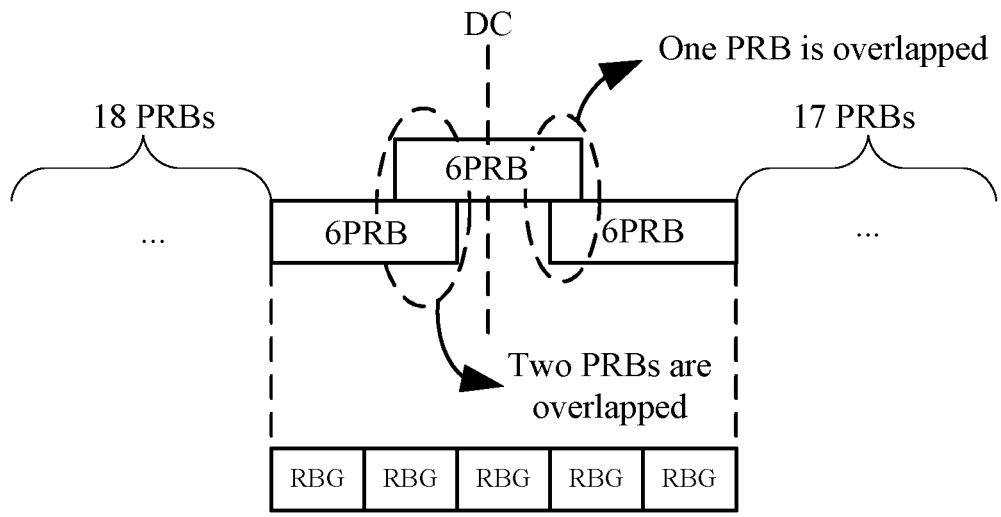
FIG. 13 is a diagram of a narrowband group at a central frequency when a system bandwidth is 10 MHz according to an exemplary embodiment of the disclosure.
Figure 14:
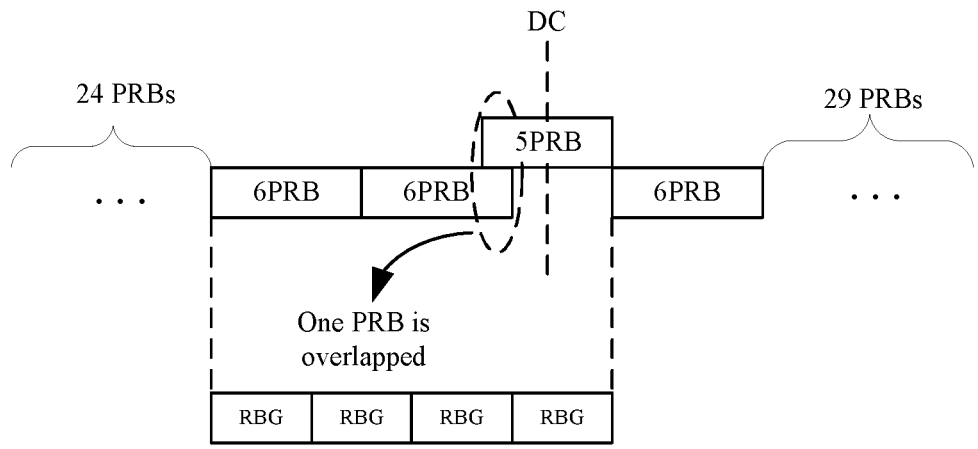
FIG. 14 is a diagram of a narrowband group at a central frequency when a system bandwidth is 15 MHz according to an exemplary embodiment of the disclosure.
Figure 15:
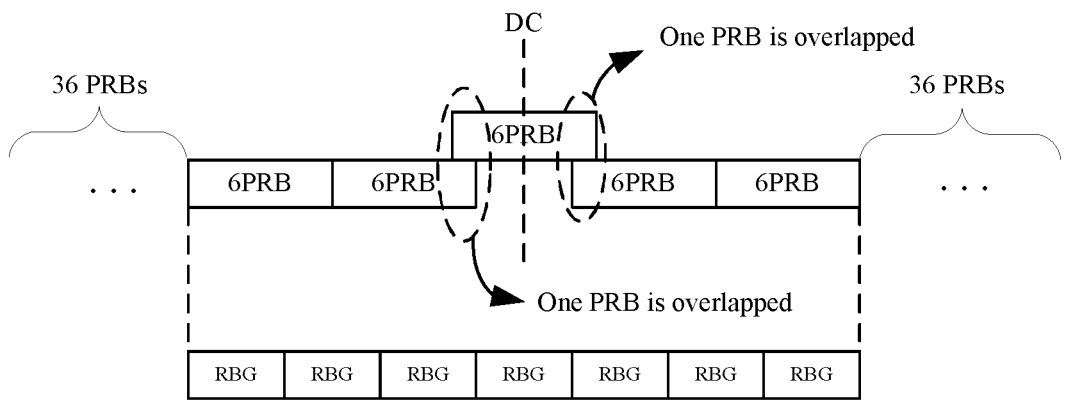
FIG. 15 is a diagram of a narrowband group at a central frequency when a system bandwidth is 20 MHz according to an exemplary embodiment of the disclosure.

When the eNB allocates multiple narrowbands to the UE, PRBs contained in part or all of the narrowbands are partially overlapped. FIG. 11 is a diagram of a narrowband group at a central frequency when a system bandwidth is 3 MHz according to an exemplary embodiment of the disclosure. FIG. 12 is a diagram of a narrowband group at a central frequency when a system bandwidth is 5 MHz according to an exemplary embodiment of the disclosure. FIG. 13 is a diagram of a narrowband group at a central frequency when a system bandwidth is 10 MHz according to an exemplary embodiment of the disclosure. FIG. 14 is a diagram of a narrowband group at a central frequency when a system bandwidth is 15 MHz according to an exemplary embodiment of the disclosure. FIG. 15 is a diagram of a narrowband group at a central frequency when a system bandwidth is 20 MHz according to an exemplary embodiment of the disclosure. As shown in FIG. 11 to FIG. 15, system bandwidths 3 MHz, 5 MHz, 10 MHz, 15 MHz and 20 MHz are provided respectively. When the system bandwidth is an odd number, if a central narrowband is five PRBs, the central narrowband and one or two narrowbands at two sides have overlapped PRBs, a plurality of narrowbands including the central narrowband shown in the figure serves as a narrowband group. It can be seen that the narrowband group is aligned with an RBG. It is satisfied that a starting PRB index is k×G, and an index of a PRB having highest frequency is k×G−1. G∈{2, 3, 4}, and k is an integer. Although the central narrowband is not aligned with the RBG, a narrowband group is constituted by overlapped PRBs between the central narrowband and the narrowbands at two sides, and the narrowband group is aligned with the RBG. Therefore when the narrowband group is allocated to the UE, the RBG is not split, and an effect on scheduling of a legacy UE is not caused.

Figure 16:
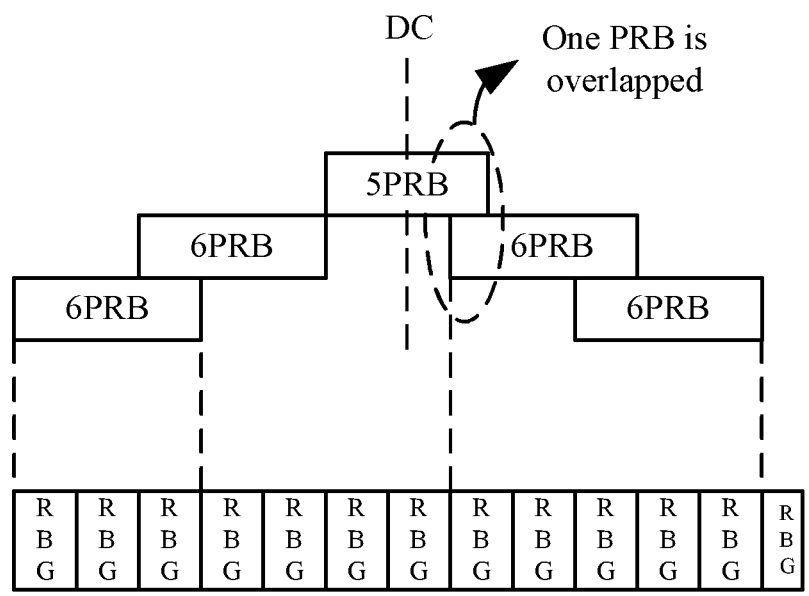
FIG. 16 is a diagram of a narrowband group out of a central frequency when a system bandwidth is 5 MHz according to an exemplary embodiment of the disclosure.
Figure 17:
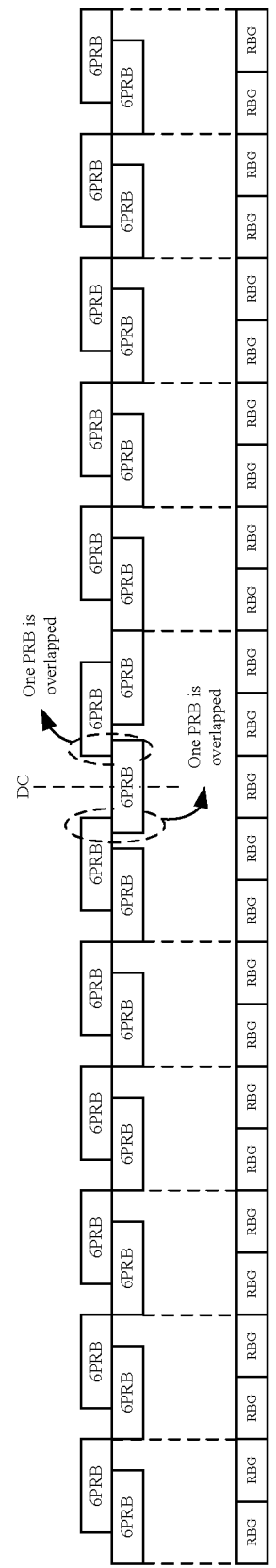
FIG. 17 is a diagram of a narrowband group out of a central frequency when a system bandwidth is 20 MHz according to an exemplary embodiment of the disclosure.

In addition to the central narrowband, PRBs contained in other narrowbands may be partially overlapped. FIG. 16 is a diagram of a narrowband group out of a central frequency when a system bandwidth is 5 MHz according to an exemplary embodiment of the disclosure. FIG. 17 is a diagram of a narrowband group out of a central frequency when a system bandwidth is 20 MHz according to an exemplary embodiment of the disclosure. FIG. 16 and FIG. 17 show diagrams of narrowband allocations when system bandwidths are 5 MHz and 20 MHz. In the figures, except a central narrowband, two adjacent narrowbands constitute a narrowband group, PRBs are overlapped in the narrowband group. PRBs are not overlapped between the narrowband groups. The narrowband group is aligned with an RBG. It is satisfied that a starting PRB index is k×G, and an index of a PRB having highest frequency is k×G−1. G∈{2, 3, 4}, and k is an integer. Thus, when the narrowband group is allocated to the UE, the RBG is not split, and an effect on scheduling of a legacy UE is not caused.

It is important to note that the above-mentioned allocation mode is not limited in an actual application process. Further, spacing between the narrowband groups shall be an integral multiple of G. Further, the eNB may put control information to all or part of overlapped PRBs, such that scheduling overheads are reduced. Under the condition that the narrowbands are not overlapped, at least one of six PRBs is needed to transmit the control information, and control overheads are 16.7%. And if two adjacent narrowbands have one overlapped PRB, the control information is put into the PRB, the control information of the PRB schedules data of ten PRBs, and control overheads are 9.1%. Further, the control information is put into the overlapped PRB, and the UE blindly detects the control information in the overlapped PRB.

The narrowbands allocated by the eNB may be predefined. For example, some fixed narrowbands of each system bandwidth are allocated to the UE. The eNB and the UE will send or receive signals on the allocated narrowbands. Or the narrowbands correspond to cell identities. Different cell identities correspond to different allocated narrowbands, and the allocated narrowbands are mentioned as above. The allocated narrowbands are also notified by the eNB. For example, a narrowband set is defined for each system bandwidth, and the eNB selects some narrowbands and notifies the UE of indexes of the narrowbands. For example, in FIG. 15, there are five narrowbands, and the UE may be notified of a working narrowband by using 5bit information. For example, '00110' is representative of allocation of third and fourth narrowbands to the UE. In an actual application process, the above-mentioned mode is not limited. Notification information is cell-specific. For example, a UE supporting an RF bandwidth smaller than a system bandwidth is notified of a downlink working narrowband of the UE in an SIB. The notified downlink working narrowband is used for transmitting control information, or is used for transmitting data information, or is used for transmitting the control information and the data information in a mixed manner. The eNB performs frequency-hopping transmission on part or all of the notified narrowbands according to a preset rule. The UE performs frequency-hopping receiving according to a preset rule. The frequency-hopping mode is: sending by frequency-hopping of every N sub-frames to a narrowband, and sending on the same narrowband within N sub-frames. Further, in view of that it spends time modulating radio frequency, sending may be performed at an interval of N sub-frames after sending is completed on the N sub-frames. Such frequency-hopping mode is not limited in actual application. The notification information may be UE-specific likewise. For example, a certain UE is notified of a downlink working narrowband through a Radio Resource Control (RRC) signaling. And the notified downlink working narrowband is used for transmitting control information, or is used for transmitting data information, or is used for transmitting the control information and the data information in a mixed manner. The eNB performs frequency-hopping transmission on part or all of the narrowbands according to a preset rule. And the UE performs frequency-hopping receiving according to a preset rule. Furthermore, the eNB may notify the UE of sub-frames corresponding to the allocated narrowbands.

Second Exemplary Embodiment

In this exemplary embodiment, an eNB allocates at least one narrowband to a UE. The at least one narrowband is at least one of narrowbands divided by expanding from a central narrowband to two sides.

If a downlink central narrowband is allocated, the same as the first exemplary embodiment, namely if $N_{RB}$ configured by a system bandwidth is an odd number, when the system bandwidth is 3 MHz or 5 MHz or 15 MHz, the central narrowband is five PRBs of a system bandwidth center, namely a PRB index interval is $[(N_{RB}-1)/2-2, (N_{RB}-1)/2+2]$, as shown in FIG. 2. PRB index intervals corresponding to 3 MHz, 5 MHz and 15 MHz respectively are [5, 9], [10, 14] and [35, 39]. Or, a central narrowband is seven PRBs of a system bandwidth center, namely a PRB index interval is $[(N_{RB}-1)/2-3, (N_{RB}-1)/2+3]$, as shown in FIG. 3. PRB index intervals corresponding to 3 MHz, 5 MHz and 15 MHz respectively are [4, 10], [9, 15] and [34, 40], marginal PRBs may be not fully occupied, and part of REs is occupied. Or, a central narrowband is six PRBs of a system bandwidth center, namely a PRB index interval is $[(N_{RB}-1)/2-3, (N_{RB}-1)/2+2]$ or $[(N_{RB}-1)/2-2, (N_{RB}-1)/2+3]$, as shown in FIG. 4 and FIG. 5. A PRB index interval corresponding to 3 MHz is [5, 10] or [4, 9], a PRB index interval corresponding to 5 MHz is [9, 14] or [10, 15], and a PRB index interval corresponding to 15 MHz is [34, 39] or [35, 40].

If $N_{RB}$ configured by the system bandwidth is an even number, namely the system bandwidth is 10 MHz or 20 MHz, the central narrowband is six PRBs of a system bandwidth center, namely a PRB index interval of the central narrowband is $[N_{RB}/2-3, N_{RB}/2+2]$, as shown in FIG. 6. Moreover, PRB index intervals corresponding to system bandwidths 10 MHz and 20 MHz are respectively [22, 27] and [47, 52].

If the allocated narrowband is not a downlink central narrowband and $N_{RB}$ is an odd number, a PRB index interval of one of the at least one narrowband is one of the following:

$$\left[\frac{N_{RB}-1}{2} - 8 - 6n, \frac{N_{RB}-1}{2} - 3 - 6n\right]; \quad (1)$$

$$\left[\frac{N_{RB}-1}{2} + 3 + 6n, \frac{N_{RB}-1}{2} + 8 + 6n\right]; \quad (2)$$

$$\left[\frac{N_{RB}-1}{2} - 9 - 6n, \frac{N_{RB}-1}{2} - 4 - 6n\right]; \quad (3)$$

$$\left[\frac{N_{RB}-1}{2} + 4 + 6n, \frac{N_{RB}-1}{2} + 9 + 6n\right]; \quad (4)$$

$$\left[0, \frac{N_{RB}-1}{2} - 3 - 6n_1\right]; \quad (5)$$

$$\left[\frac{N_{RB}-1}{2} + 3 + 6n_1, N_{RB} - 1\right]; \quad (6)$$

$$\left[0, \frac{N_{RB}-1}{2} - 4 - 6n_2\right]; \quad (7)$$

$$\left[\frac{N_{RB}-1}{2} + 4 + 6n_2, N_{RB} - 1\right]; \quad (8)$$

or when $N_{RB}$ is an even number, a PRB index interval of one of the at least one narrowband is one of the following:

$$[N_{RB}/2 - 9 - 6n, N_{RB}/2 - 4 - 6n]; \quad (1)$$

$$[N_{RB}/2 + 3 + 6n, N_{RB}/2 + 8 + 6n]; \quad (2)$$

$$\left[0, \frac{N_{RB}}{2} - 4 - 6n_3\right]; \quad (3)$$

$$\left[\frac{N_{RB}}{2} + 3 + 6n_3, N_{RB} - 1\right]; \quad (4)$$

in which $N_{RB}$ is a PRB number corresponding to a system bandwidth, n is a non-negative integer, $$n_1 = \left\lceil \frac{N_{RB}-1}{12} - \frac{4}{3} \right\rceil, \quad n_2 = \left\lceil \frac{N_{RB}-1}{12} - \frac{3}{2} \right\rceil, \quad n_3 = \left\lceil \frac{N_{RB}}{12} - \frac{3}{2} \right\rceil.$$

$\lceil \cdot \rceil$ is representative of rounding up to an integer. The PRB index interval is within an interval $[0, N_{RB}-1]$. The narrowbands allocated by the eNB are pre-defined or notified in a manner similar to that in the first exemplary embodiment. Further, the eNB notifies the UE of sub-frames corresponding to the allocated narrowbands.

Third Exemplary Embodiment

In this exemplary embodiment, an eNB allocates at least one uplink narrowband to a UE. When the uplink narrowband is allocated to the UE, it should be ensured that at least one complete SRS narrowband having four PRBs exists in an uplink narrowband. Thus, during scheduling, the eNB schedules the UE to a narrowband corresponding to four PRBs needing to send SRSs, so it can be ensured that data and SRSs of the UE may be sent without giving up one of them. A PRB index interval corresponding to an uplink narrowband satisfying the above-mentioned condition is: [4k, 4k+5] or [4k−6, 4k−1] or [4k−1, 4k+4]. k is an integer, a PRB index refers to a PRB index obtained by numbering, starting from zero, PRBs in an SRS bandwidth of a cell from lowest frequency. PRBs having frequency lower than that of a PRB at an SRS starting position are numbered as −1, −2, . . . in sequence from highest frequency to lowest frequency.

Another representation mode of these narrowbands is provided hereinbelow. A PRB index of a narrowband is a PRB index obtained by numbering, starting from zero, PRBs in a system bandwidth according to an ascending order from lowest frequency to highest frequency.

Expression 1: an index of a starting PRB of the narrowband satisfying the above-mentioned condition is: $\lfloor N_{RB}^{UL}/2 \rfloor - m_{SRS,0}/2 + 4k + i$. $i \in C$, $C=\{0, 2\}$, k is an integer, $m_{SRS,0}$ is the number of PRBs contained in an SRS bandwidth, namely the number of PRBs contained within a frequency domain range of an SRS. The value is a cell-specific parameter notified by the eNB. $\lfloor N_{RB}^{UL}/2 \rfloor - m_{SRS,0}/2$ is an index of a starting PRB of the SRS bandwidth of the whole cell. $N_{RB}^{UL}$ is a PRB number corresponding to an uplink system bandwidth. The value refers to Table 1. The PRB index interval is within an interval $[0, N_{RB}^{UL}-1]$.

If the system bandwidth is 5M, $N_{RB}^{UL}=25$, PRB indexes are: 0-24 respectively, and $m_{SRS,0}=20$, a starting RB index of the SRS bandwidth of the cell is:

$\lfloor 25/2 \rfloor - 20/2 = 2$, and an ended PRB index is 2+20−1=21. SRS bandwidths housing four PRBs are: [2, 5], [6, 9], [10, 13], [14, 17] and

[18, 21] respectively, so starting PRB indexes of the narrowband may be: 2, 4, 6, 8, 10, 12, 14, 16, 18 and 20.

The PRB index interval of the narrowband is:

$$[\lfloor N_{RB}^{UL}/2 \rfloor - m_{SRS,0}/2 + 4k+i, \lfloor N_{RB}^{UL}/2 \rfloor - m_{SRS,0}/2 + 4k+i+5],$$

in which i∈C, C={0, 2}, and k is an integer.

Figure 18:
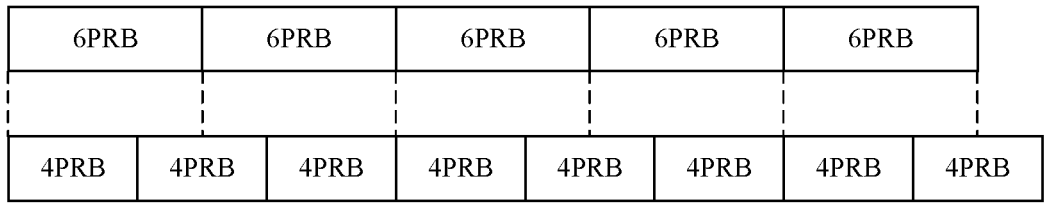
FIG. 18 is a diagram of a narrowband when a narrowband starting PRB index in an SRS bandwidth is $\lfloor N_{RB}^{UL}/2 \rfloor - m_{SRS,0}/2+4k+i$ and narrowbands are not overlapped according to an exemplary embodiment of the disclosure.
Figure 19:
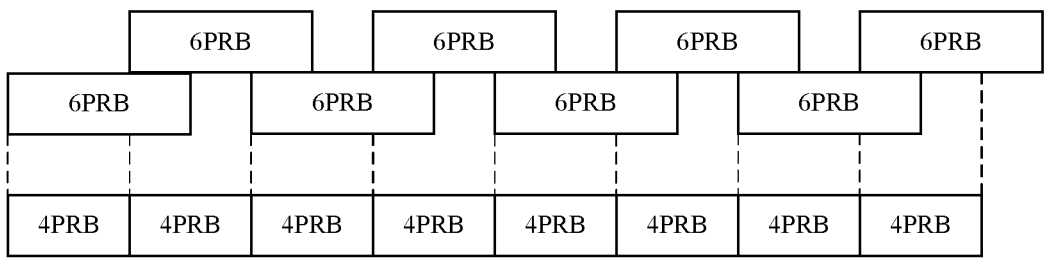
FIG. 19 is a diagram of a narrowband when a narrowband starting PRB index in an SRS bandwidth is $\lfloor N_{RB}^{UL}/2 \rfloor - m_{SRS,0}/2+4k+i$ and narrowbands are overlapped according to an exemplary embodiment of the disclosure.

FIG. 18 is a diagram of a narrowband when a narrowband starting PRB index in an SRS bandwidth is $\lfloor N_{RB}^{UL}/2 \rfloor = m_{SRS,0}/2 + 4k+i$ and narrowbands are not overlapped according to an exemplary embodiment of the disclosure. As shown in FIG. 18, an SRS area is 32 PRBs. At least one PRB is included in a narrowband allocated to the UE for transmitting a PUSCH. It can be seen that each narrowband has a complete SRS bandwidth having four PRBs. Thus, during scheduling, the eNB schedules the UE to a narrowband corresponding to four PRBs needing to send SRSs. So it can be ensured that data of the UE and SRSs are sent without giving up one of the data of the UE and the SRSs. However, this mode results in that some SRS bandwidths having four PRBs are short of corresponding narrowbands. For example, the second SRS bandwidth having four PRBs does not belong to any one narrowband having six PRBs. During frequency hopping of an SRS of the UE to the SRS bandwidth having four PRBs, if the eNB schedules a PUSCH of the UE to the first 6PRB narrowband, the SRS and the PUSCH are sent simultaneously when the PUSCH of the UE is located at the later four PRBs of the narrowband. The later four PRBs of the narrowband bring some limits to scheduling of the eNB. Therefore, overlapping between narrowbands solves this problem. FIG. 19 is a diagram of a narrowband when a narrowband starting PRB index in an SRS bandwidth is $\lfloor N_{RB}^{UL}/2 \rfloor - m_{SRS,0}/2 + 4k+i$ and narrowbands are overlapped according to an exemplary embodiment of the disclosure. As shown in FIG. 19, two PRBs are overlapped between two narrowbands, and each SRS bandwidth corresponding to four PRBs is on a certain narrowband. All or some of the overlapped narrowbands are allocated to a UE. Such overlapping mode is not limited in an actual application process. Different PRBs may be overlapped between different two narrowbands.

The above-mentioned narrowband is used for transmitting a PUSCH or transmitting a PUSCH and a PUCCH in a mixed manner. An example for mixed transmission of the PUSCH and the PUCCH is that: a marginal PRB transmits the PUCCH while the other PRBs transmit the PUSCH. If the above-mentioned narrowband is used for transmitting the PUSCH and the PUCCH transmission narrowband is an individual narrowband, a narrowband for transmitting the PUCCH in an SRS bandwidth of a cell shall satisfy the above-mentioned condition. A narrowband for transmitting a PRACH in the SRS bandwidth of the cell shall satisfy the above-mentioned condition, so an uplink data narrowband and a control narrowband may be completely adjacent.

Figure 20:
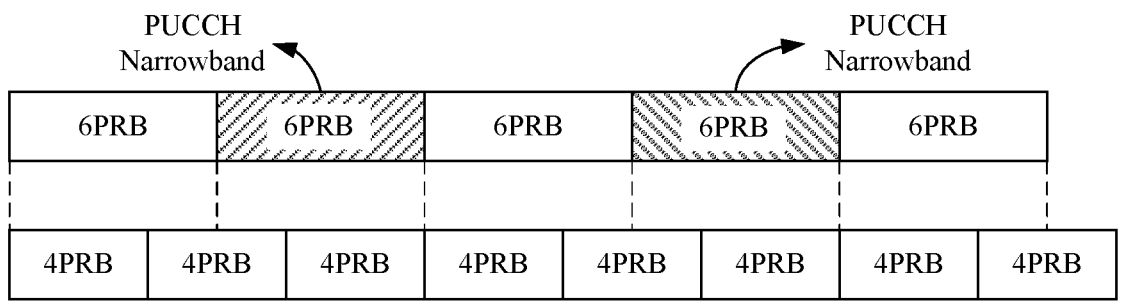
FIG. 20 is a diagram of PRACH and PUCCH narrowbands when a narrowband starting PRB index in an SRS bandwidth is $\lfloor N_{RB}^{UL}/2 \rfloor - m_{SRS,0}/2+4k+i$ and narrowbands are not overlapped according to an exemplary embodiment of the disclosure.
Figure 21:
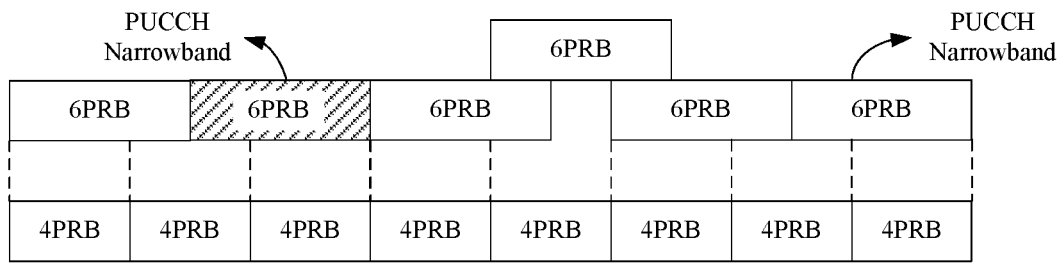
FIG. 21 is a diagram of PRACH and PUCCH narrowbands when a narrowband starting PRB index in an SRS bandwidth is $\lfloor N_{RB}^{UL}/2 \rfloor - m_{SRS,0}/2+4k+i$ and narrowbands are overlapped according to an exemplary embodiment of the disclosure.

FIG. 20 is a diagram of PRACH and PUCCH narrowbands when a narrowband starting PRB index in an SRS bandwidth is $\lfloor N_{RB}^{UL}/2 \rfloor - m_{SRS,0}/2 + 4k+i$ and narrowbands are not overlapped according to an exemplary embodiment of the disclosure. FIG. 21 is a diagram of PRACH and PUCCH narrowbands when a narrowband starting PRB index in an SRS bandwidth is $\lfloor N_{RB}^{UL}/2 \rfloor - m_{SRS,0}/2 + 4k+i$ and narrowbands are overlapped according to an exemplary embodiment of the disclosure. As shown in FIG. 20 and FIG. 21, PRACH and PUCCH allocation processes are provided. In addition, narrowbands for transmitting the PUCCH and the PUSCH may be overlapped. Not only that, a narrowband for transmitting the PUCCH or the PRACH is located outside an SRS area.

Expression 2: an index of a starting PRB of an uplink narrowband satisfying that at least one complete SRS narrowband having four PRBs exists in the uplink narrowband is:

$\lfloor N_{RB}^{UL}/2 \rfloor - m_{SRS,0}/2 + 4k-1$. k is an integer.

A PRB index interval of the narrowband is:

$[\lfloor N_{RB}^{UL}/2 \rfloor - m_{SRS,0}/2 + 4k-1, \lfloor N_{RB}^{UL}/2 \rfloor - m_{SRS,0}/2 + 4k+4]$. k is an integer.

Figure 22:
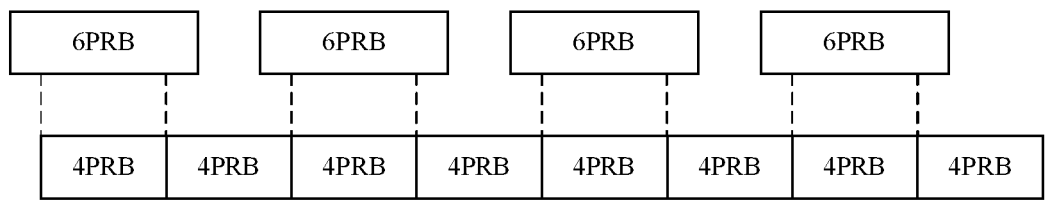
FIG. 22 is a diagram of a narrowband when a narrowband starting PRB index in an SRS bandwidth is $\lfloor N_{RB}^{UL}/2 \rfloor - m_{SRS,0}/2+4k-1$ and narrowbands are not overlapped according to an exemplary embodiment of the disclosure.
Figure 23:
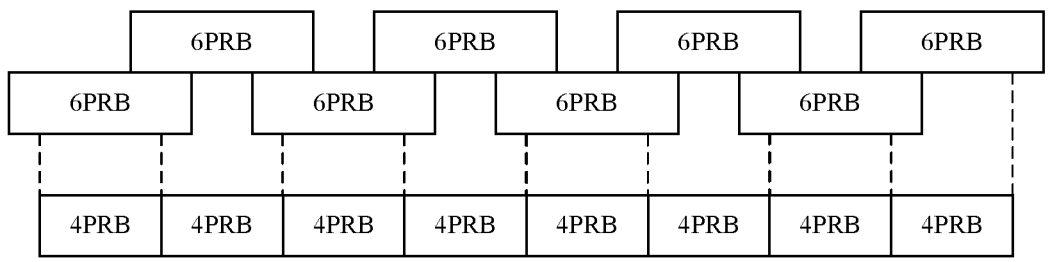
FIG. 23 is a diagram of a narrowband when a narrowband starting PRB index in an SRS bandwidth is $\lfloor N_{RB}^{UL}/2 \rfloor - m_{SRS,0}/2+4k-1$ and narrowbands are overlapped according to an exemplary embodiment of the disclosure.

FIG. 22 is a diagram of a narrowband when a narrowband starting PRB index in an SRS bandwidth is $\lfloor N_{RB}^{UL}/2 \rfloor - m_{SRS,0}/2 + 4k-1$ and narrowbands are not overlapped according to an exemplary embodiment of the disclosure. As shown in FIG. 22, each narrowband contains a complete SRS bandwidth having four PRBs. FIG. 23 is a diagram of a narrowband when a narrowband starting PRB index in an SRS bandwidth is $\lfloor N_{RB}^{UL}/2 \rfloor - m_{SRS,0}/2 + 4k-1$ and narrowbands are overlapped according to an exemplary embodiment of the disclosure. As shown in FIG. 23, each narrowband also contains a complete SRS bandwidth having four PRBs. Narrowbands allocated to the UE by the eNB are all or part of the narrowbands. In an actual application process, the above-mentioned overlapping mode is not limited, and different PRBs may be overlapped between different two narrowbands.

The above-mentioned narrowband is used for transmitting a PUSCH or transmitting a PUSCH and a PUCCH in a mixed manner. If the above-mentioned narrowband is used for transmitting the PUSCH and the PUCCH transmission narrowband is an individual narrowband, a narrowband for transmitting the PUCCH in an SRS bandwidth of a cell shall satisfy:

$\lfloor N_{RB}^{UL}/2 \rfloor - m_{SRS,0}/2 + 4k-3$. k is an integer.

A PRB index interval of the narrowband is:

$[\lfloor N_{RB}^{UL}/2 \rfloor - m_{SRS,0}/2 + 4k-3, \lfloor N_{RB}^{UL}/2 \rfloor - m_{SRS,0}/2 + 4k+2]$. k is an integer.

A narrowband for transmitting a PRACH in the SRS bandwidth of the cell shall satisfy the above-mentioned condition, so an uplink data narrowband and a control narrowband may be completely adjacent. FIG. 24 is a diagram of PRACH and PUCCH narrowbands when a narrowband starting PRB index in an SRS bandwidth is $\lfloor N_{RB}^{UL}/2 \rfloor - m_{SRS,0}/2 + 4k-1$ and narrowbands are not overlapped according to an exemplary embodiment of the disclosure. FIG. 25 is a diagram of PRACH and PUCCH narrowbands when a narrowband starting PRB index in an SRS bandwidth is $\lfloor N_{RB}^{UL}/2 \rfloor - m_{SRS,0}/2 + 4k-1$ and narrowbands are overlapped according to an exemplary embodiment of the disclosure. As shown in FIG. 24 and FIG. 25, PRACH and PUCCH allocation processes are provided. In addition, narrowbands for transmitting the PUCCH and the PUSCH are overlapped. Not only that, a narrowband for transmitting the PUCCH or the PRACH may be located outside an SRS area.

The narrowbands allocated by the eNB are pre-defined. For example, some fixed narrowbands of each system bandwidth are allocated to the UE, the eNB and the UE will send or receive signals on the allocated narrowbands. Or the narrowbands correspond to cell identities. Different cell identities correspond to different allocated narrowbands, and the allocated narrowbands are mentioned as above. The allocated narrowbands are also notified by the eNB. For example, a narrowband set is defined for each system bandwidth, and the eNB selects some narrowbands and notifies the UE of indexes of the narrowbands. In an actual application process, the above-mentioned mode is not limited. Notification information is cell-specific. For example, a UE supporting an RF bandwidth smaller than a system bandwidth is notified of a downlink working narrowband of the UE in an SIB. And the notified downlink working narrowband is used for transmitting control information, or is used for transmitting data information, or is used for transmitting the control information and the data information in a mixed manner. The UE performs frequency-hopping transmission on part or all of the notified narrowbands according to a preset rule. And the eNB performs frequency-hopping receiving according to a preset rule. The notification information is UE-specific likewise. For example, a certain UE is notified of a downlink working narrowband through an RRC signaling. And the notified downlink working narrowband is used for transmitting control information, or is used for transmitting data information, or is used for transmitting the control information and the data information in a mixed manner. The UE performs frequency-hopping transmission on part or all of the narrowbands according to a preset rule. The eNB may perform frequency-hopping receiving according to a preset rule. Furthermore, the eNB notifies the UE of sub-frames corresponding to the allocated narrowbands.

Fourth Exemplary Embodiment

In this exemplary embodiment, narrowbands that are allocated to a UE by an eNB contain uplink narrowbands and downlink narrowbands. There is at least one uplink narrowband, and there is also at least one downlink narrowband. Conditions needing to be satisfied by the uplink narrowbands and the downlink narrowbands refer to the first exemplary embodiment to the third exemplary embodiment, which will not be elaborated herein.

Fifth Exemplary Embodiment

If a UE configured with a transmission mode 9 or 10 is configured as PMI or RI reporting, the UE will suppose pre-coded granularity of multiple Resource Blocks (RB). In addition, the UE will suppose that all PRBs in a PRG are identically pre-coded. Similar to the UE, an eNB will identically pre-code all PRBs in a PRG.

In some situations, the PRG is usually based on a system bandwidth.

However, different from the conventional art, in the exemplary embodiment, the UE transmits data on a narrowband or one of multiple narrowbands, and CSI feedback is completed on the basis of one of the at least one narrowband. Therefore, the PRG shall be determined by one of the at least one narrowband. In one of the at least one narrowband, every X successive PRBs, starting from a first PRB, constitute a PRG. If a modulus of M over X is greater than zero, the size of the last PRG is: $M-X\lfloor M/X \rfloor$, $\lfloor \cdot \rfloor$ is representative of rounding down to an integer, the first PRB is a PRB having lowest frequency or a PRB having highest frequency, and M is the number of PRBs contained in this narrowband or one of the multiple narrowbands. For example, if the narrowband has seven PRBs, indexes from lowest frequency to highest frequency are 0, 1, 2, . . . , 6, and X=3, every three PRBs, starting from the PRB having the lowest frequency, constitute a PRG, PRB#0, 1, 2 are a PRG, PRB#3, 4, 5 are a PRG, PRB#6 is a PRG. Or, every three PRBs, starting from the PRB having the highest frequency, constitute a PRG, PRB#4, 5, 6 are a PRG, PRB#1, 2, 3 are a PRG, PRB#0 is a PRG.

The value of X may be one of the following:

(1) X∈{1, 2, 3, 4};

Specifically, if the size of one of at least one narrowband is six PRBs, and indexes are re-numbered as 0, 1, 2, . . . , 5 from lowest frequency to highest frequency, every two PRBs are a PRG, namely PRB#0 and PRB#1 are a PRG, PRB#2 and PRB#3 are a PRG, and PRB#4 and PRB#5 are a PRG. Or every three PRBs are a PRG, namely PRB#0, 1, 2 are a PRG, and PRB#3, 4, 5 are a PRG.

(2) X is M/2 or rounding down M/2 to an integer, or a positive integer smaller than or equal to M/2.

(3) X is smaller than or equal to S/2 or rounding down S/2 to an integer, or a positive integer smaller than or equal to S/2. S is the number of the PRBs contained in the sub-band, corresponding to the system bandwidth where one of the at least one narrowband is located, for reporting the CSI, for example, when the system bandwidth is 20 MHz, S=8.

(4) X obtained by any two of the condition 1, the condition 2 and the condition 3 is endowed with a maximum value.

In an exemplary embodiment, the eNB allocates at least one narrowband for the UE. The at least one narrowband is at least one uplink narrowband or at least one downlink narrowband. A PRB index interval of one of the at least one narrowband is one of the following:

$$[n_{offset}+6k, n_{offset}+6k+5], [N_{RB}-6-n_{offset}-6k, N_{RB}-1-n_{offset}-6k];$$

in which $N_{RB}$ is a number of PRBs corresponding to a system bandwidth, a PRB index in the PRB index interval refers to the PRB index obtained by numbering, starting from zero, PRBs in the system bandwidth according to an ascending order from lowest frequency to highest frequency, $n_{offset}$ is a preset value or a value configured by an eNB, and k is a non-negative integer.

FIG. 26 is a schematic of an eNB allocating at least one narrowband for an UE according to an exemplary embodiment of the disclosure. As shown in FIG. 26, in this exemplary embodiment, the eNB allocates the at least one narrowband for an UE. The at least one narrowband is obtained by offsetting, starting from each end of a system bandwidth, $n_{offset}$ PRBs to determine an initial position corresponding to each end and dividing, starting from the initial position to an center of the system bandwidth, each six adjacent PRBs into one narrowband, so as to obtain the at least one narrowband.

FIG. 27 is a flowchart of a method for acquiring narrowband allocation according to an embodiment of the disclosure. As shown in FIG. 27, the method may include the following step.

At Step S2602: at least one narrowband allocated by an eNB are acquired. At least one Physical Resource Block (PRB) contained in each of the at least one narrowband is not overlapped, or at least one PRB contained in part or all of the at least one narrowband is partially overlapped.

In an exemplary embodiment, when one of the at least one narrowband is a downlink central narrowband, and $N_{RB}$ is an odd number, a PRB index interval of the downlink central narrowband is one of the following:

$$[(N_{RB}-1)/2-2, (N_{RB}-1)/2+2]; \quad (1)$$

$$[(N_{RB}-1)/2-3, (N_{RB}-1)/2+3]; \quad (2)$$

$$[(N_{RB}-1)/2-3, (N_{RB}-1)/2+2]; \quad (3)$$

$$[(N_{RB}-1)/2-2, (N_{RB}-1)/2+3]; \quad (4)$$

or when $N_{RB}$ is an even number, a PRB index interval of the central narrowband is: $[N_{RB}/2-3, N_{RB}/2+2]$.

$N_{RB}$ is a number of PRBs corresponding to a system bandwidth, and a PRB index in the PRB index interval refers to the PRB index obtained by numbering, starting from zero, PRBs in a downlink system bandwidth according to an ascending order from lowest frequency to highest frequency. A value range of the PRB index is {0, 1, 2, . . . , $N_{RB}$}.

In an exemplary embodiment, when one of the downlink narrowband is a downlink narrowband but not a downlink central narrowband or one of the at least one narrowband is an uplink narrowband, a PRB index interval of one of the at least one narrowband is one of the following:

[k×G,k×G+5]; (1)

[k×G−6,k×G−1]; (2)

[k×G−1,k×G+4]; (3)

[$N_{RB}$−$N_{RB}$ modG−a×G,$N_{RB}$−1]; (4)

in which G∈{2, 3, 4}, a∈{0, 1, 2}. $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

In an exemplary embodiment, when one of the at least one narrowband is a downlink narrowband but not a downlink central narrowband, a value of G is associated with the system bandwidth.

In an exemplary embodiment, under the condition that one of the at least one narrowband is a downlink non-central narrowband, when a number of PRBs corresponding to the system bandwidth belongs to [11, 26], G=2, or when a number of PRBs corresponding to the system bandwidth belongs to [27, 63], G=3, or when a number of PRBs corresponding to the system bandwidth belongs to [64, 110], G=4.

In an exemplary embodiment, when G=4, multiple narrowbands allocated to the UE comprise at least one narrowband group. Each narrowband group consists of two successive narrowbands, each of the two successive narrowbands contains six successive PRBs, PRBs contained in the two successive narrowbands are not overlapped, and a PRB index interval of each narrowband group is [4×n, 4×n+11], n being a non-negative integer.

In an exemplary embodiment, when one of the at least one narrowband is a downlink narrowband but not a downlink central narrowband, and $N_{RB}$ is an odd number, a PRB index interval of one of the at least one narrowband is one of the following:

$$\left[\frac{N_{RB}-1}{2}-8-6n, \frac{N_{RB}-1}{2}-3-6n\right];$$ (1)

$$\left[\frac{N_{RB}-1}{2}+3+6n, \frac{N_{RB}-1}{2}+8+6n\right];$$ (2)

$$\left[\frac{N_{RB}-1}{2}-9-6n, \frac{N_{RB}-1}{2}-4-6n\right];$$ (3)

$$\left[\frac{N_{RB}-1}{2}+4+6n, \frac{N_{RB}-1}{2}+9+6n\right];$$ (4)

$$\left[0, \frac{N_{RB}-1}{2}-3-6n_1\right];$$ (5)

$$\left[\frac{N_{RB}-1}{2}+3+6n_1, N_{RB}-1\right];$$ (6)

$$\left[0, \frac{N_{RB}-1}{2}-4-6n_2\right];$$ (7)

$$\left[\frac{N_{RB}-1}{2}+4+6n_2, N_{RB}-1\right];$$ (8)

or when $N_{RB}$ is an even number, a PRB index interval of one of the at least one narrowband is one of the following:

[$N_{RB}/2-9-6n$, $N_{RB}/2-4-6n$]; (1)

[$N_{RB}/2+3+6n$, $N_{RB}/2+8+6n$]; (2)

$$\left[0, \frac{N_{RB}}{2}-4-6n_3\right];$$ (3)

$$\left[\frac{N_{RB}}{2}+3+6n_3, N_{RB}-1\right];$$ (4)

in which $N_{RB}$ is a number of PRBs corresponding to a system bandwidth, n is a non-negative integer, $$n_1 = \left\lceil \frac{N_{RB}-1}{12} - \frac{4}{3} \right\rceil, \; n_2 = \left\lceil \frac{N_{RB}-1}{12} - \frac{3}{2} \right\rceil, \; n_3 = \left\lceil \frac{N_{RB}}{12} - \frac{3}{2} \right\rceil,$$

and ⌈•⌉ is representative of rounding up to an integer.

In an exemplary embodiment, multiple narrowbands allocated to the UE include at least one narrowband group. Each narrowband group consists of two or more narrowbands. PRBs contained in adjacent narrowbands in each narrowband group are partially overlapped. A PRB index interval of each narrowband group is [4×n, 4×n+b×G], in which n is a non-negative integer, and b is a positive integer.

In an exemplary embodiment, a number of PRBs spaced between narrowbands except a central narrowband or narrowband groups is an integral multiple of G.

In an exemplary embodiment, under the condition that the at least one PRB contained in part or all of the multiple narrowbands are partially overlapped, control information is mapped to part or all of resources of overlapped PRBs.

In an exemplary embodiment, a PRG may be determined by one of the at least one narrowband.

In an exemplary embodiment, in one of the at least one narrowband, every X successive PRBs, starting from a first PRB, constitute a PRG, if a modulus of M over X is greater than zero, the size of the last PRG is: M−X⌊M/X⌋. ⌊•⌋ is representative of rounding down to an integer, the first PRB is a PRB having lowest frequency or a PRB having highest frequency, and M is a number of PRBs contained in or one of the at least one narrowband.

In an exemplary embodiment, factors for determining X may include, but are not limited to, at least one of the following:

(1) a number of PRBs contained in one of the at least one narrowband, and (2) a number of PRBs contained in a sub-band, corresponding to a system bandwidth where one of the at least one narrowband is located, for reporting a CSI.

In an exemplary embodiment, X satisfies one of the following conditions:

condition 1: X∈{1, 2, 3, 4};

condition 2: X is M/2 or rounding down M/2 to an integer, or a positive integer smaller than or equal to M/2;

condition 3: X is smaller than or equal to S/2 or rounding down S/2 to an integer, or a positive integer smaller than or equal to S/2, in which S is the number of the PRBs contained in the sub-band, corresponding to the system bandwidth where one of the at least one narrowband is located, for reporting a CSI, and condition 4: X obtained by any two of the condition 1, the condition 2 and the condition 3 is endowed with a maximum value.

FIG. 28 is a structural block diagram of a device for narrowband allocation according to an embodiment of the disclosure. As shown in FIG. 28, the device for narrowband allocation includes: an allocation component 10, which is arranged to allocate at least one narrowband to a User Equipment (UE). At least one Physical Resource Block (PRB) contained in each of the at least one narrowband is not overlapped, or at least one PRB contained in part or all of the at least one narrowband is partially overlapped.

The device as shown in FIG. 28 solves the problems of relatively single narrowband allocation mode and low flexibility, thus reducing overheads of indicating resource allocations. An RBG is not split, and an effect is not caused on scheduling of a legacy UE.

In an exemplary embodiment, when one of the at least one narrowband is a downlink central narrowband, and $N_{RB}$ is an odd number, a PRB index interval of the downlink central narrowband is one of the following:

$$[(N_{RB}-1)/2-2, (N_{RB}-1)/2+2]; \quad (1)$$

$$[(N_{RB}-1)/2-3, (N_{RB}-1)/2+3]; \quad (2)$$

$$[(N_{RB}-1)/2-3, (N_{RB}-1)/2+2]; \quad (3)$$

$$[(N_{RB}-1)/2-2, (N_{RB}-1)/2+3]; \quad (4)$$

or when $N_{RB}$ is an even number, a PRB index interval of the central narrowband is: $[N_{RB}/2-3, N_{RB}/2+2]$.

$N_{RB}$ is a number of PRBs corresponding to a system bandwidth, and a PRB index in the PRB index interval refers to the PRB index obtained by numbering, starting from zero, PRBs in a downlink system bandwidth according to an ascending order from lowest frequency to highest frequency.

In an exemplary embodiment, when one of the at least one narrowband is a downlink narrowband but not a downlink central narrowband or one of the at least one narrowband is an uplink narrowband, a PRB index interval of this narrowband or one of the at least one narrowband is one of the following:

$$[k \times G, k \times G+5]; \quad (1)$$

$$[k \times G-6, k \times G-1]; \quad (2)$$

$$[k \times G-1, k \times G+4]; \quad (3)$$

$$[N_{RB}-N_{RB} \bmod G-a \times G, N_{RB}-1]; \quad (4)$$

in which G∈{2, 3, 4}, a∈{0, 1, 2}. $N_{RB}$ is a number of PRBs corresponding to a system bandwidth. A PRB index, for downlink, in the PRB index interval refers to the PRB index obtained by numbering, starting from zero, PRBs in the system bandwidth according to an ascending order from lowest frequency to highest frequency. And a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

In an exemplary embodiment, when one of the at least one narrowband is a downlink narrowband but not a downlink central narrowband, a value of G is associated with the system bandwidth.

In an exemplary embodiment, under the condition that one of the at least one narrowband is a downlink non-central narrowband, when a number of PRBs corresponding to the system bandwidth belongs to [11, 26], G=2, or when a number of PRBs corresponding to the system bandwidth belongs to [27, 63], G=3, or when a number of PRBs corresponding to the system bandwidth belongs to [64, 110], G=4.

In an exemplary embodiment, when G=4, the multiple narrowbands allocated to the UE comprise at least one narrowband group. Each narrowband group consists of two successive narrowbands, each of the two successive narrowbands contains six successive PRBs, PRBs contained in the two successive narrowbands are not overlapped, and a PRB index interval of each narrowband group iso [4×n, 4×n+11], n being a non-negative integer.

In an exemplary embodiment, when one of the at least one narrowband is a downlink narrowband but not a downlink central narrowband, and $N_{RB}$ is an odd number, a PRB index interval of one of the at least one narrowband is one of the following:

$$\left[\frac{N_{RB}-1}{2}-8-6n, \frac{N_{RB}-1}{2}-3-6n\right]; \quad (1)$$

$$\left[\frac{N_{RB}-1}{2}+3+6n, \frac{N_{RB}-1}{2}+8+6n\right]; \quad (2)$$

$$\left[\frac{N_{RB}-1}{2}-9-6n, \frac{N_{RB}-1}{2}-4-6n\right]; \quad (3)$$

$$\left[\frac{N_{RB}-1}{2}+4+6n, \frac{N_{RB}-1}{2}+9+6n\right]; \quad (4)$$

$$\left[0, \frac{N_{RB}-1}{2}-3-6n_1\right]; \quad (5)$$

$$\left[\frac{N_{RB}-1}{2}+3+6n_1, N_{RB}-1\right]; \quad (6)$$

$$\left[0, \frac{N_{RB}-1}{2}-4-6n_2\right]; \quad (7)$$

$$\left[\frac{N_{RB}-1}{2}+4+6n_2, N_{RB}-1\right]; \quad (8)$$

or when $N_{RB}$ is an even number, a PRB index interval of one of the at least one narrowband is one of the following:

$$[N_{RB}/2-9-6n, N_{RB}/2-4-6n]; \quad (1)$$

$$[N_{RB}/2+3+6n, N_{RB}/2+8+6n]; \quad (2)$$

$$\left[0, \frac{N_{RB}}{2}-4-6n_3\right]; \quad (3)$$

$$\left[\frac{N_{RB}}{2}+3+6n_3, N_{RB}-1\right]; \quad (4)$$

in which $N_{RB}$ is a number of PRBs corresponding to a system bandwidth, n is a non-negative integer, $$n_1 = \left\lceil \frac{N_{RB}-1}{12} - \frac{4}{3} \right\rceil, \ n_2 = \left\lceil \frac{N_{RB}-1}{12} - \frac{3}{2} \right\rceil, \ n_3 = \left\lceil \frac{N_{RB}}{12} - \frac{3}{2} \right\rceil,$$

and ⌈•⌉ is representative of rounding up to an integer.

In an exemplary embodiment, multiple narrowbands allocated to the UE include at least one narrowband group. Each narrowband group consists of two or more narrowbands, PRBs contained in adjacent narrowbands in each narrowband group are partially overlapped. And a PRB index interval of each narrowband group is [4×n, 4×n+11b×G], in which n is a non-negative integer and b is a positive integer.

In an exemplary embodiment, a number of PRBs spaced between narrowbands except a central narrowband or narrowband groups is an integral multiple of G.

In an exemplary embodiment, under the condition that the at least one PRB contained in part or all of the multiple narrowbands are partially overlapped, control information is mapped to part or all of resources of overlapped PRBs.

In an exemplary embodiment, when one of the at least one narrowband is a downlink narrowband, contents transmitted by the downlink narrowband may include, but are not limited to, at least one of the following:
  (1) downlink control information; and
  (2) downlink data.

In an exemplary embodiment, when one of at least one narrowband is an uplink narrowband, contents transmitted by the uplink narrowbands includes, but are not limited to, one of the following:
  (1) a PUSCH;
  (2) a PUCCH, and
  (3) a PRACH.

In an exemplary embodiment, an allocation mode of at least one narrowband includes one of the following: a pre-defined allocation mode and an eNB notification-based allocation mode.

In an exemplary embodiment, the eNB notification-based allocation mode may include one of the following:
  (1) an eNB performs notification by using cell-specific information; and
  (2) an eNB performs notification by using UE-specific information.

In an exemplary embodiment, the eNB or the UE sends downlink/uplink information on at least one narrowband in a frequency hopping manner.

In an exemplary embodiment, the eNB instructs the UE to allocate sub-frame information corresponding to the at least one narrowband.

In an exemplary embodiment, a PRG is determined by one of the at least one narrowband.

In an exemplary embodiment, in one of the at least one narrowband, every X successive PRBs, starting from a first PRB, constitute a PRG, when a modulus of M over X is greater than zero, a size of the last PRG is: M−X⌊M/X⌋, ⌊•⌋ is representative of rounding down to an integer, the first PRB is a PRB having lowest frequency or a PRB having highest frequency, and M is a number of PRBs contained in one of the at least one narrowband.

In an exemplary embodiment, factors for determining X may include, but are not limited to, at least one of the following:
  (1) a number of PRBs contained in one of the at least one narrowband, and
  (2) a number of PRBs contained in a sub-band, corresponding to a system bandwidth where one of the at least one narrowband is located, for reporting a CSI.

In an exemplary embodiment, X satisfies one of the following conditions:
  condition 1: X∈{1, 2, 3, 4};
  condition 2: X is M/2 or rounding down M/2 to an integer, or a positive integer smaller than or equal to M/2;
  condition 3: X is smaller than or equal to S/2 or rounding down S/2 to an integer, or a positive integer smaller than or equal to S/2, in which S is the number of the PRBs contained in the sub-band, corresponding to the system bandwidth where one of the at least one narrowband is located, for reporting a CSI, and
  condition 4: X obtained by any two of the condition 1, the condition 2 and the condition 3 is endowed with a maximum value.

FIG. 29 is a structural block diagram of a device for acquiring narrowband allocation according to an embodiment of the disclosure. As shown in FIG. 29, the device for acquiring the narrowband allocation includes: an acquisition component 20 to acquire at least one narrowband allocated by an evolved Node B (eNB), and at least one Physical Resource Block (PRB) contained in each of the at least one narrowband is not overlapped, or at least one PRB contained in part or all of the at least one narrowband is partially overlapped.

In an exemplary embodiment, a PRG is determined by one of the at least one narrowband.

In an exemplary embodiment, in one of the at least one narrowband, every X successive PRBs, starting from a first PRB, constitute a PRG, when a modulus of M over X is greater than zero, a size of the last PRG is: M−X⌊M/X⌋, ⌊•⌋ is representative of rounding down to an integer, the first PRB is a PRB having lowest frequency or a PRB having highest frequency, and M is a number of PRBs contained in one of the at least one narrowband.

In an exemplary embodiment, factors for determining X may include, but are not limited to, at least one of the following:
  (1) a number of PRBs contained in one of the at least one narrowband, and
  (2) a number of PRBs contained in a sub-band, corresponding to a system bandwidth where one of the at least one narrowband is located, for reporting a CSI.

In an exemplary embodiment, X satisfies one of the following conditions:
  condition 1: X∈{1, 2, 3, 4};
  condition 2: X is M/2 or rounding down M/2 to an integer, or a positive integer smaller than or equal to M/2;
  condition 3: X is smaller than or equal to S/2 or rounding down S/2 to an integer, or a positive integer smaller than or equal to S/2, in which S is the number of the PRBs contained in the sub-band, corresponding to the system bandwidth where one of the at least one narrowband is located, for reporting a CSI, and
  condition 4: X obtained by any two of the condition 1, the condition 2 and the condition 3 is endowed with a maximum value.

From the above description, it can be seen that the above-mentioned embodiments achieve the following technical effects (it is important to note that these effects are achieved by some exemplary embodiments): MTC equipment is usually low-cost equipment, characterized by small supported RF bandwidths, single receiving antennae and the like, an RF receiving bandwidth being 1.4 MHz generally. Under the condition that a system bandwidth is greater than 1.4 MHz, by means of the technical solution provided in the embodiments of the disclosure, the MTC UE defines multiple downlink working narrowbands. And the MTC UE is enabled to receive at least one of downlink control information and data on these narrowbands. And narrowbands are divided for the MTC UE. Therefore, overheads of indicating resource allocations are further reduced, thus neither splitting an RBG nor causing an effect on scheduling of a legacy UE. In addition, by means of the technical solution provided in the embodiments of the disclosure, the MTC UE defines multiple uplink working narrowbands, so it can be ensured that at least one complete SRS narrowband having four PRBs exists in an uplink narrowband. Thus, during scheduling, the eNB schedules the UE to a narrowband corresponding to four PRBs needing to send SRSs, so it can be ensured that data of the UE and SRSs is sent without giving up one of the data of the UE and the SRSs.

Obviously, a person skilled in the art shall understand that all of the above-mentioned components or steps in the disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit component respectively, or multiple components or steps therein are manufactured into a single integrated circuit component. Thus, the disclosure is not limited to a combination of any specific hardware and software.

The above are the exemplary embodiments of the disclosure, and not intended to limit the disclosure. As will occur to a person skilled in the art, the disclosure is susceptible to various modifications and changes. Any modifications, equivalent replacements, improvements and the like made as claimed in the claims of the disclosure shall fall within the scope of protection of the disclosure.

INDUSTRIAL APPLICABILITY

As disclosed above, the method and device for narrowband allocation, and a method and device for acquiring narrowband allocation, provided in the embodiments of the disclosure, have the following beneficial effects: overheads of indicating uplink and downlink resource allocations can be reduced, a downlink narrowband neither splits an RBG nor causes an effect on scheduling of a legacy UE, and an uplink narrowband contains an SRS bandwidth having four PRBs, so that an eNB can schedule the UE to send data without giving up sending an SRS.

What is claimed is:

1. A method for narrowband allocation, comprising:
allocating at least one narrowband to a User Equipment (UE), wherein at least one Physical Resource Block (PRB) contained in each of the at least one narrowband is not overlapped, or at least one PRB contained in part or all of the at least one narrowband is partially overlapped;
wherein when one of the at least one narrowband is a downlink narrowband but not a downlink central narrowband or one of the at least one narrowband is an uplink narrowband, a PRB index interval of one of the at least one narrowband is one of the following:

[k×G, k×G+5];

[k×G−6, k×G−1];

[k×G−1, k×G+4];

[$N_{RB}-N_{RB}$ mod G−a×G, $N_{RB}-1$];

wherein G∈{2,3,4}, a∈{0,1,2,}, $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

2. The method as claimed in claim 1, wherein when one of the at least one narrowband is a downlink central narrowband and $N_{RB}$ is an odd number, a PRB index interval of the downlink central narrowband is one of the following:

[$(N_{RB}-1)/2-2, (N_{RB}-1)/2+2$];

[$(N_{RB}-1)/2-3, (N_{RB}-1)/2+3$];

[$(N_{RB}-1)/2-3, (N_{RB}-1)/2+2$];

[$(N_{RB}-1)/2-2, (N_{RB}-1)/2+3$];

or when $N_{RB}$ is an even number, a PRB index interval of the central narrowband is: [$N_{RB}/2-3, N_{RB}/2+2$];
wherein $N_{RB}$ is a number of PRBs corresponding to a system bandwidth, and a PRB index in the PRB index interval refers to the PRB index obtained by numbering, starting from zero, PRBs in a downlink system bandwidth according to an ascending order from lowest frequency to highest frequency.

3. The method as claimed in claim 1, wherein when one of the at least one narrowband is a downlink narrowband but not a downlink central narrowband, a value of G is associated with the system bandwidth.

4. The method as claimed in claim 3, wherein under the condition that one of the at least one narrowband is a downlink non-central narrowband, when a number of PRBs corresponding to the system bandwidth belongs to PRB index interval [11, 26], G=2 or when a number of PRBs corresponding to the system bandwidth belongs to PRB index interval [27, 63], G=3, or when a number of PRBs corresponding to the system bandwidth belongs to PRB index interval [64, 110], G=4.

5. The method as claimed in claim 1, wherein when G=4, multiple narrowbands allocated to the UE comprise at least one narrowband group, wherein each narrowband group consists of two successive narrowbands, each of the two successive narrowbands contains six successive PRBs, PRBs contained in the two successive narrowbands are not overlapped, and a PRB index interval of each narrowband group is [4×n, 4×n+11], n being a non-negative integer.

6. The method as claimed in claim 1, wherein under the condition that the at least one PRB contained in part or all of the multiple narrowbands are partially overlapped, control information is mapped to part or all of resources of overlapped PRBs.

7. The method as claimed in claim 1, wherein when one of the at least one narrowband is a downlink narrowband, contents transmitted by the downlink narrowband comprise at least one of the following: downlink control information, and downlink data;

or when one of the at least one narrowband is an uplink narrowband, contents transmitted by the uplink narrowband comprise at least one of the following:
a Physical Uplink Shared Channel (PUSCH);
a Physical Uplink Control Channel (PUCCH); and
a Physical Random Access Channel (PRACH).

8. The method as claimed in claim 1, wherein an allocation mode of the at least one narrowband comprises one of the following:
a pre-defined allocation mode; and
an evolved Node B (eNB) notification-based allocation mode.

9. The method as claimed in claim 1, wherein an eNB notification-based allocation mode comprises one of the following:
an eNB performs notification by using cell-specific information; and
an eNB performs notification by using UE-specific information.

10. The method as claimed in claim 1, wherein the eNB or the UE sends downlink or uplink information on the at least one narrowband in a frequency hopping manner.

11. The method as claimed in claim 1, wherein the eNB instructs the UE to allocate sub-frame information corresponding to the at least one narrowband.

12. The method as claimed in claim 1, wherein a Precoding Block Group (PRG) is determined by one of the at least one narrowband.

13. The method as claimed in claim 1, wherein in one of the at least one narrowband, every X successive PRBs, starting from a first PRB, constitute a PRG, when a modulus of M over X is greater than zero, a size of the last PRG is:
$M - X \lfloor M/X \rfloor$, wherein $\lfloor \cdot \rfloor$ is representative of rounding down to an integer, the first PRB is a PRB having lowest frequency or a PRB having highest frequency, and M is a number of PRBs contained in one of the at least one narrowband.

14. The method as claimed in claim 13, wherein factors for determining X comprise at least one of the following: a number of PRBs contained in one of the at least one narrowband, and a number of PRBs contained in a sub-band, corresponding to a system bandwidth where one of the at least one narrowband is located, for reporting a Channel Status Indicator (CSI).

15. The method as claimed in claim 13, wherein X satisfies one of the following conditions:
condition 1: $X \in \{1, 2, 3, 4\}$;
condition 2: X is M/2 or rounding down M/2 to an integer, or a positive integer smaller than or equal to M/2;
condition 3: X is smaller than or equal to S/2 or rounding down S/2 to an integer, or a positive integer smaller than or equal to S/2, wherein S is the number of the PRBs contained in the sub-band, corresponding to the system bandwidth where one of the at least one narrowband is located, for reporting a CSI; and
condition 4: X obtained by any two of the condition 1, the condition 2 and the condition 3 is endowed with a maximum value.

16. The method as claimed in claim 1, wherein a PRB index interval of one of the at least one narrowband is one of the following:

$[n_{offset}+6k, n_{offset}+6k+5], [N_{RB}-6-n_{offset}-6k, N_{RB}-1-n_{offset}-6k]$;

wherein $N_{RB}$ is a number of PRBs corresponding to a system bandwidth, a PRB index in the PRB index interval refers to the PRB index obtained by numbering, starting from zero, PRBs in the system bandwidth according to an ascending order from lowest frequency to highest frequency, $n_{offset}$ is a preset value or a value configured by an eNB, and k is a non-negative integer.

17. A method for acquiring narrowband allocation, comprising:
acquiring at least one narrowband allocated by an evolved Node B (eNB), wherein at least one Physical Resource Block (PRB) contained in each of the at least one narrowband is not overlapped, or at least one PRB contained in part or all of the at least one narrowband is partially overlapped;
wherein when one of the at least one narrowband is a downlink narrowband but not a downlink central narrowband or one of the at least one narrowband is an uplink narrowband, a PRB index interval of one of the at least one narrowband is one of the following:

$[k \times G, k \times G+5]$;

$[k \times G-6, k \times G-1]$;

$[k \times G-1, k \times G+4]$;

$[N_{RB}-N_{RB} \bmod G - a \times G, N_{RB}-1]$;

wherein $G \in \{2,3,4\}$, $a \in \{0,1,2\}$, $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

18. A device for narrowband allocation, comprising a hardware processor configured to execute program units stored on a memory, the program units comprising:
an allocation component to allocate at least one narrowband to a User Equipment (UE), wherein at least one Physical Resource Block (PRB) contained in each of the at least one narrowband is not overlapped, or at least one PRB contained in part or all of the at least one narrowband is partially overlapped;
wherein when one of the at least one narrowband is a downlink narrowband but not a downlink central narrowband or one of the at least one narrowband is an uplink narrowband, a PRB index interval of one of the at least one narrowband is one of the following:

$[k \times G, k \times G+5]$;

$[k \times G-6, k \times G-1]$;

$[k \times G-1, k \times G+4]$;

$[N_{RB}-N_{RB} \bmod G - a \times G, N_{RB}-1]$;

wherein $G \in \{2,3,4\}$, $a \in \{0,1,2\}$, $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

19. A device for acquiring narrowband allocation, comprising a hardware processor configured to execute program units stored on a memory, the program units comprising:

an acquisition component to acquire at least one narrowband allocated by an evolved Node B (eNB), wherein at least one Physical Resource Block (PRB) contained in each of the at least one narrowband is not overlapped, or at least one PRB contained in part or all of the at least one narrowband is partially overlapped;

wherein when one of the at least one narrowband is a downlink narrowband but not a downlink central narrowband or one of the at least one narrowband is an uplink narrowband, a PRB index interval of one of the at least one narrowband is one of the following:

$[k \times G, k \times G+5]$;

$[k \times G-6, k \times G-1]$;

$[k \times G-1, k \times G+4]$;

$[N_{RB}-N_{RB} \bmod G-a \times G, N_{RB}-1]$;

wherein $G \in \{2,3,4\}$, $a \in \{0,1,2\}$, $N_{RB}$ is a number of PRBs corresponding to a system bandwidth, a PRB index, for downlink, in the PRB index interval refers to the PRB index obtained by numbering, starting from zero, PRBs in the system bandwidth according to an ascending order from lowest frequency to highest frequency, and a PRB index, for uplink, in the PRB index interval refers to the PRB index obtained by numbering, starting from zero, PRBs in a Sounding Reference Signal (SRS) bandwidth of a cell according to an ascending order from lowest frequency to highest frequency, and k is a non-negative integer.

* * * * *